(12) United States Patent
Kawashima

(10) Patent No.: US 8,739,906 B2
(45) Date of Patent: Jun. 3, 2014

(54) HYBRID-TYPE CONSTRUCTION MACHINE AND CONTROL METHOD FOR HYBRID-TYPE CONSTRUCTION MACHINE

(75) Inventor: Koji Kawashima, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 222 days.

(21) Appl. No.: 13/377,254

(22) PCT Filed: Jun. 15, 2010

(86) PCT No.: PCT/JP2010/060141
§ 371 (c)(1),
(2), (4) Date: Dec. 9, 2011

(87) PCT Pub. No.: WO2010/147121
PCT Pub. Date: Dec. 23, 2010

(65) Prior Publication Data
US 2012/0089288 A1 Apr. 12, 2012

(30) Foreign Application Priority Data

Jun. 19, 2009 (JP) .................................. 2009-146553
Jun. 19, 2009 (JP) .................................. 2009-146554

(51) Int. Cl.
*B60K 6/42* (2007.10)
(52) U.S. Cl.
USPC ........ 180/65.22; 701/50; 180/53.1; 180/53.4; 180/65.285; 180/65.275; 60/445
(58) Field of Classification Search
None
See application file for complete search history.

(56) References Cited

U.S. PATENT DOCUMENTS

| | | | |
|---|---|---|---|
| 5,896,930 A * | 4/1999 | Arai | 172/2 |
| 6,202,411 B1 * | 3/2001 | Yamashita | 60/445 |
| 6,666,022 B1 * | 12/2003 | Yoshimatsu et al. | 60/413 |
| 6,678,972 B2 * | 1/2004 | Naruse et al. | 37/466 |
| 6,708,787 B2 * | 3/2004 | Naruse et al. | 180/53.8 |
| 6,922,990 B2 * | 8/2005 | Naruse et al. | 60/414 |
| 7,086,226 B2 * | 8/2006 | Oguri | 60/414 |
| 7,143,859 B2 * | 12/2006 | Ohtsukasa | 180/307 |
| 7,392,653 B2 * | 7/2008 | Sugano | 60/452 |
| 7,669,413 B2 * | 3/2010 | Komiyama et al. | 60/414 |
| 7,904,225 B2 * | 3/2011 | Takeda et al. | 701/50 |

(Continued)

FOREIGN PATENT DOCUMENTS

| | | | |
|---|---|---|---|
| JP | 08-284706 | * 10/1996 | F02D 29/04 |
| JP | 10-103112 | 4/1998 | |

(Continued)

OTHER PUBLICATIONS

International Search Report mailed on Jul. 13, 2010.

*Primary Examiner* — Thomas Tarcza
*Assistant Examiner* — Richard Goldman
(74) *Attorney, Agent, or Firm* — IPUSA, PLLC

(57) ABSTRACT

A hybrid-type construction machine includes a controller configured to control a revolution speed of an engine; a hydraulic pump configured to be driven by the engine; a motor generator configured to assist the engine; and a hydraulic circuit configured to supply an operating oil discharged from the hydraulic pump to a hydraulic load, wherein when the controller determines that the hydraulic circuit is in an excessive output state, the controller controls the revolution speed of the engine so as to be lower than an ordinary revolution speed of the engine while controlling the motor generator to generate electricity.

13 Claims, 15 Drawing Sheets

(56) References Cited

U.S. PATENT DOCUMENTS

| | | | |
|---|---|---|---|
| 7,980,073 B2 * | 7/2011 | Jensen | 60/414 |
| 8,087,240 B2 * | 1/2012 | Morinaga et al. | 60/414 |
| 8,362,629 B2 * | 1/2013 | Weber et al. | 290/4 D |
| 8,408,341 B2 * | 4/2013 | Dalum et al. | 180/65.22 |
| 8,424,302 B2 * | 4/2013 | Morinaga et al. | 60/431 |
| 8,468,816 B2 * | 6/2013 | Sora | 60/414 |
| 2005/0036894 A1 * | 2/2005 | Oguri | 417/212 |
| 2005/0246082 A1 * | 11/2005 | Miki et al. | 701/50 |
| 2010/0219007 A1 * | 9/2010 | Dalum et al. | 180/65.22 |
| 2011/0098873 A1 * | 4/2011 | Koga et al. | 701/22 |
| 2011/0276212 A1 * | 11/2011 | Wu | 701/22 |
| 2012/0089288 A1 * | 4/2012 | Kawashima | 701/22 |
| 2012/0296510 A1 * | 11/2012 | Kawashima | 701/22 |
| 2012/0303227 A1 * | 11/2012 | Nakamura | 701/50 |
| 2013/0197768 A1 * | 8/2013 | Imura et al. | 701/50 |

FOREIGN PATENT DOCUMENTS

| | | | | |
|---|---|---|---|---|
| JP | 2003-028071 | * | 1/2003 | F04B 49/00 |
| JP | 2004-076649 | | 3/2004 | |
| JP | 2007-333017 | | 12/2007 | |

* cited by examiner

HYBRID-TYPE CONSTRUCTION MACHINE AND CONTROL METHOD FOR HYBRID-TYPE CONSTRUCTION MACHINE

TECHNICAL FIELD

The present invention relates to a hybrid-type construction machine which drives a hydraulic pump by an engine to drive a hydraulic load.

BACKGROUND ART

The hybrid-type construction machine ordinarily drives a hydraulic pump by the output of an engine (an internal combustion engine) and performs operations with generated hydraulic pressure. The engine is driven efficiently by assisting the engine with an electric motor. The electric motor is driven by electric power from a battery. The battery is chargeable and dischargeable and supplies electric power to the electric motor.

Meanwhile, if the engine is not assisted, electric power generated by the engine and regenerative electric power caused by the hydraulic load is electrically charged. With this, the electric motor can be assisted by the battery which is maintained by charging to be charged to some extent.

As described, the hybrid-type construction machine can assist the engine by the electric motor. Therefore, the maximum output required by the engine can be decreased. Thus, a small engine may be used. When an output larger than the maximum output of the engine is required, the electric motor may be used to assist the demand. The hybrid-type construction machine uses a variable displacement hydraulic pump so that hydraulic pressure is generated in response to a requirement of the hydraulic load (see Patent Document 1).

RELATED ART DOCUMENT

Patent Document 1: Japanese Laid-Open Patent Application No. 10-103112

DISCLOSURE OF THE INVENTION

Problems to be Solved by the Invention

In a hydraulically-driven system using a variable displacement hydraulic pump, when the hydraulic load does not require hydraulic pressure or the hydraulic load is light, the tilting angle of the hydraulic pump is lowered to perform a negative control by which the hydraulic pump discharge flow rate is decreased. In the hydraulically-driven system, the engine is constantly rotated at a predetermined speed. Even when it is unnecessary to supply hydraulic pressure to the hydraulic load, the hydraulic pump is constantly driven.

Therefore, when it is unnecessary to supply hydraulic pressure to the hydraulic load, the operating oil discharged from the hydraulic pump is not supplied to the hydraulic load and directly returned to the tank. It is better to reduce the flow rate of the operating oil discharged from the hydraulic pump. By performing the above negative control, the tilting angle of the variable displacement hydraulic pump is changed to reduce a pump discharge flow rate to suppress useless energy consumed by the hydraulic pump. As described, if the pump flow rate is decreased by changing the tilting angle with negative control, the hydraulic pump still consumes useless energy because the engine is driven at a revolution speed in proportion to a predetermined revolution speed of the engine. When work is done by supplying hydraulic pressure driven by the hydraulic pump driven by the engine, the engine is ordinarily driven at a constant revolution speed. When the hydraulic load such as a hydraulic cylinder is driven, the torque of the engine is increased to generate the hydraulic pressure required by the hydraulic load. The hydraulic pressure is supplied from the hydraulic pump to the hydraulic load. At this time, if the hydraulic pressure increases too much, there is a danger that the hydraulic piping and such can break. Therefore, a relief function of setting an upper limit (relief pressure) of hydraulic pressure and immediately returning the operating oil discharged from the hydraulic pump is provided in the hydraulic circuit. Specifically, by providing a relief valve between a discharge port of the hydraulic pump and the hydraulic control valve, the operating oil of higher pressure discharged from the hydraulic pump is controlled to return to a tank via the relief valve.

For example, when high pressure operating oil is supplied to the hydraulic cylinder as the hydraulic load, even if the hydraulic cylinder does not move due to a heavy load on the hydraulic cylinder, the hydraulic pump continues to discharge the operating oil. Therefore, the hydraulic pressure inside the hydraulic piping suddenly increases. If the hydraulic pressure exceeds an upper limit value in this case, the relief valve is operated to immediately return the high pressure operating oil discharged from the hydraulic pump to thereby prevent the pressure inside the hydraulic piping from increasing.

As described, even when the relief function is active, the engine drives the hydraulic pump at a constant speed. Thus, high pressure operating oil is continuously discharged from the hydraulic pump. Because the operating oil returned from the relief valve to the tank plays no role, the hydraulic pump unnecessarily pressurizes and then discharges the operating oil. Thus, energy is unnecessarily consumed.

Means for Solving Problems

According to an aspect of the embodiments of the present invention, there is provided a hybrid-type construction machine including a controller configured to control a revolution speed of an engine; a hydraulic pump configured to be driven by the engine; a motor generator configured to assist the engine; and a hydraulic circuit configured to supply an operating oil discharged from the hydraulic pump to a hydraulic load, wherein when the controller determines that the hydraulic circuit is in an excessive output state, the controller controls the revolution speed of the engine so as to be lower than an ordinary revolution speed of the engine while controlling the motor generator to generate electricity.

Preferably, the above hybrid-type construction machine further includes a first pressure sensor configured to detect the pressure of the operating oil discharged from the hydraulic pump; a control valve provided in the hydraulic circuit and configured to control a flow of the operating oil into the hydraulic load; and a negative control metering valve provided between the control valve and the tank; and a second pressure sensor provided between the control valve and the negative control metering valve and configured to detect negative control pressure, wherein the controller compares a first discharge quantity of the hydraulic pump acquired from a detection value of the first pressure sensor with a second discharge quantity of the hydraulic pump acquired from a detection value of the second pressure sensor, and the controller controls the revolution speed of the engine so as to be lower than the ordinary revolution speed of the engine while controlling the motor generator to generate the electricity depending on a result of the comparison.

The hybrid-type construction machine may further include a relief valve configured to return the operating oil discharged from the hydraulic pump to a tank when a pressure inside the hydraulic circuit exceeds a predetermined pressure, wherein, while the operating oil is returned to the tank via the relief valve, the controller controls the revolution speed of the engine so as to be lower than the ordinary revolution speed of the engine while controlling the motor generator to generate the electricity.

The hybrid-type construction machine may further include a detecting unit configured to detect a value indicative of the pressure inside the hydraulic circuit, wherein the controller increases or decreases the revolution speed of the engine based on the value detected by the detecting unit.

Further, the detecting unit may include a fluid meter configured to detect a flow rate of the operating oil returned from the relief valve to the tank, and the controller changes the revolution speed of the engine based on the flow rate detected by the fluid meter.

In the above hybrid-type construction machine, the controller may control the motor generator to run as a motor when the revolution speed of the engine is increased.

Further, the controller may control the motor generator with a torque control when the revolution speed of the engine is maintained to have a predetermined value.

Further, the controller may control the motor generator with a revolution speed control when the revolution speed of the motor generator is increased or decreased.

Further, the controller may control the motor generator with a revolution speed control when the revolution speed of the motor generator is increased or decreased.

According to another aspect of the embodiments of the present invention, there is provided a control method of a hybrid-type construction machine including a hydraulic pump configured to be driven by the engine; a motor generator configured to assist the engine; and a hydraulic circuit configured to supply an operating oil discharged from the hydraulic pump to a hydraulic load, the control method including determining whether the hydraulic circuit is in an excessive output state; and controlling a revolution speed of the engine so as to be lower than an ordinary revolution speed of the engine by controlling the motor generator to generate electricity.

In the control method of the hybrid-type construction machine, it is preferable that the controlling is to run the motor generator as a motor when the revolution speed of the engine is increased.

Further, the controlling may control the motor generator with a torque control when the revolution speed of the engine is maintained to have a predetermined value.

Further, the controlling may control the motor generator with a revolution speed control when the revolution speed of the motor generator is increased or decreased.

Further, the controlling may determine that the hydraulic circuit is in the excessive output state relative to an operation condition of the hydraulic load.

Effect of the Invention

According to the above invention, when the hydraulic circuit is in a condition in which the negative control is performed and in an excessive output condition in which the relief valve of the hydraulic circuit is opened, the revolution speed of the engine is decreased to reduce the operating oil discharge quantity of the hydraulic pump. With this, it is possible to suppress unnecessary energy consumption by reducing the quantity of the operating oil supplied to the hydraulic circuit from the hydraulic pump. If there is no excessive output state, the revolution speed of the engine is increased so as to return to a revolution speed in an ordinary mode. With this, the hydraulic pump can ordinarily supply the hydraulic pressure. At this time, the engine revolution speed is increased and decreased by controlling the revolution speed of the motor generator thereby enabling to rapidly increase and decrease the revolution speed more rapidly than by a control of only the revolution speed of the engine.

DETAILED DESCRIPTION OF THE PREFERRED EMBODIMENTS

Embodiments of the present invention are described with reference to figures.

Figure 1:
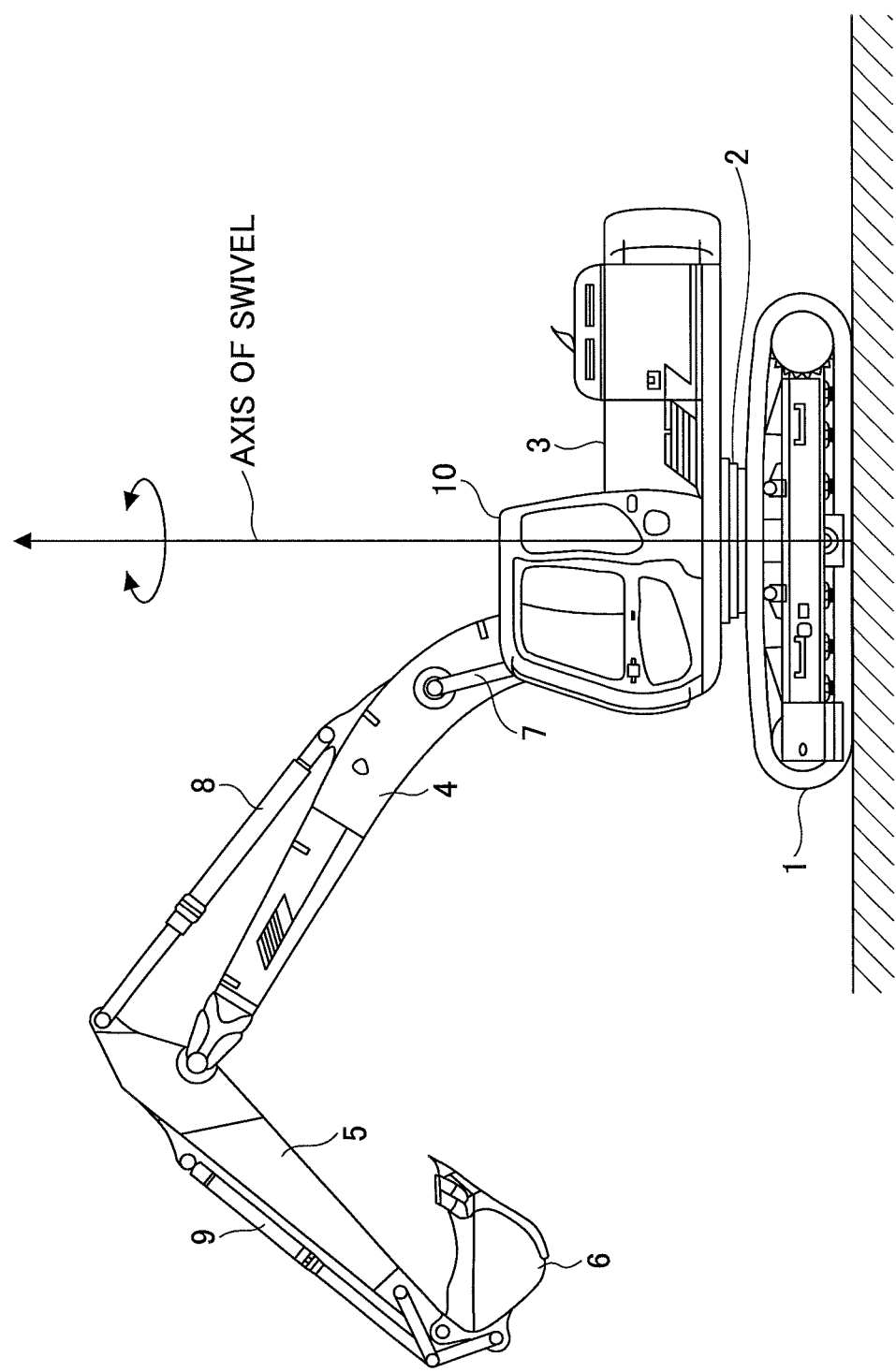
FIG. 1 is a side view of a hybrid-type power shovel.

As an example of a hybrid-type construction machine to which the embodiments of the present invention is applicable, a hybrid-type power shovel is briefly described. FIG. 1 is a side view of the hybrid power shovel. The hybrid-type construction machine to which the present invention is applicable is not limited to a hydraulic shovel.

An upper-part swiveling body 3 is installed in a lower-part traveling body 1 of the hybrid-type power shovel via a swivel mechanism 2. A boom 4 extends from the upper-part swiveling body 3. An arm 5 is connected to the end of a boom 4. Further, a bucket 6 is connected to the end of the arm 5. The boom 4, the arm 5, and the bucket 6 are hydraulically driven by a boom cylinder 7, an arm cylinder 8, and a bucket cylinder 9, respectively. Further, a cabin 10 and power sources (not graphically illustrated) are mounted on the upper-part swiveling body 3.

First Embodiment

Figure 2:
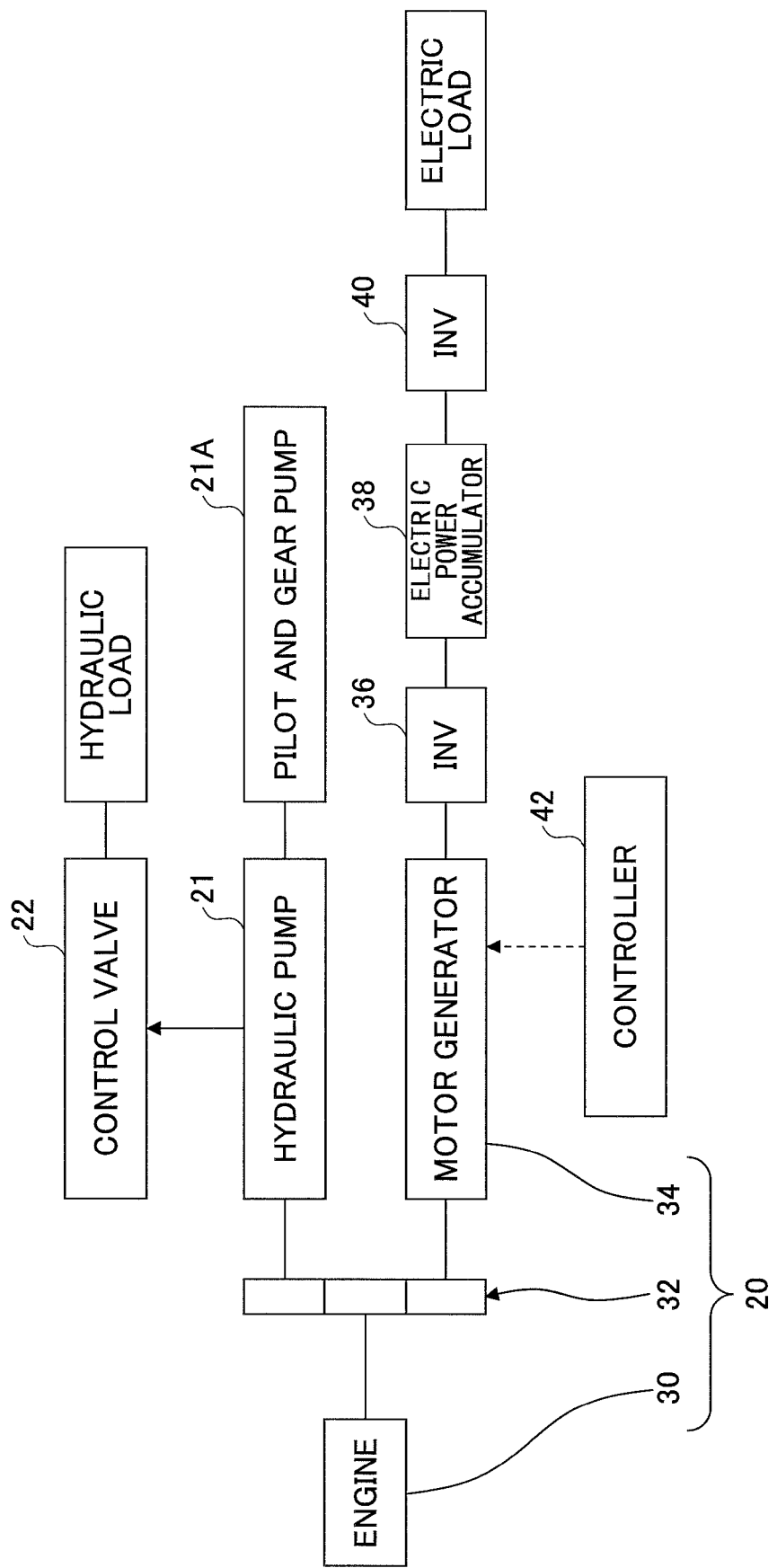
FIG. 2 is a block chart of a drive train of the hybrid-type power shovel.

FIG. 2 is a block chart illustrating the structure of a drivetrain of the hybrid-type power shovel of a first embodiment. An engine 30 such as an internal combustion engine and a motor generator 34 are connected to a splitter 32, which is a power distributor. A variable displacement hydraulic pump 21 is connected to the splitter 32 and driven by the output of the splitter 32 to thereby discharge high-pressure operating oil.

The operating oil discharged from the hydraulic pump 21 is sent to a control valve 22 including a switch valve and supplied from the control valve 22 to a hydraulic load such as a hydraulic cylinder and a hydraulic motor. A pilot gear pump 21A for detecting and controlling hydraulic output is connected to the hydraulic pump 21.

The motor generator 34 is connected to an electric power accumulator 38 including a battery via the inverter (INV) 36. The motor generator 34 is driven by electric power supplied from the electric power accumulator 38 to operate as an electric motor and to assist the engine 30. Further, the motor generator 34 functions as a generator to charge the electric power accumulator 38 by receiving engine power via the splitter 32. An electrical load including an electric motor and an electric actuator is connected to the electric power accumulator 38 via an inverter (INV) 40 to be operated by the electric power supplied from the electric power accumulator 38.

In the system illustrated in FIG. 2, operations of the engine 30, the motor generator 34, and the hydraulic pump 21 are controlled by a controller 42. Especially, the controller 42 controls the output (an assist amount) of the motor generator 34. With this, the output of the engine 30 is constantly maintained to be an appropriate value so as to avoid abnormality in the operation of the engine 30.

Figure 3:
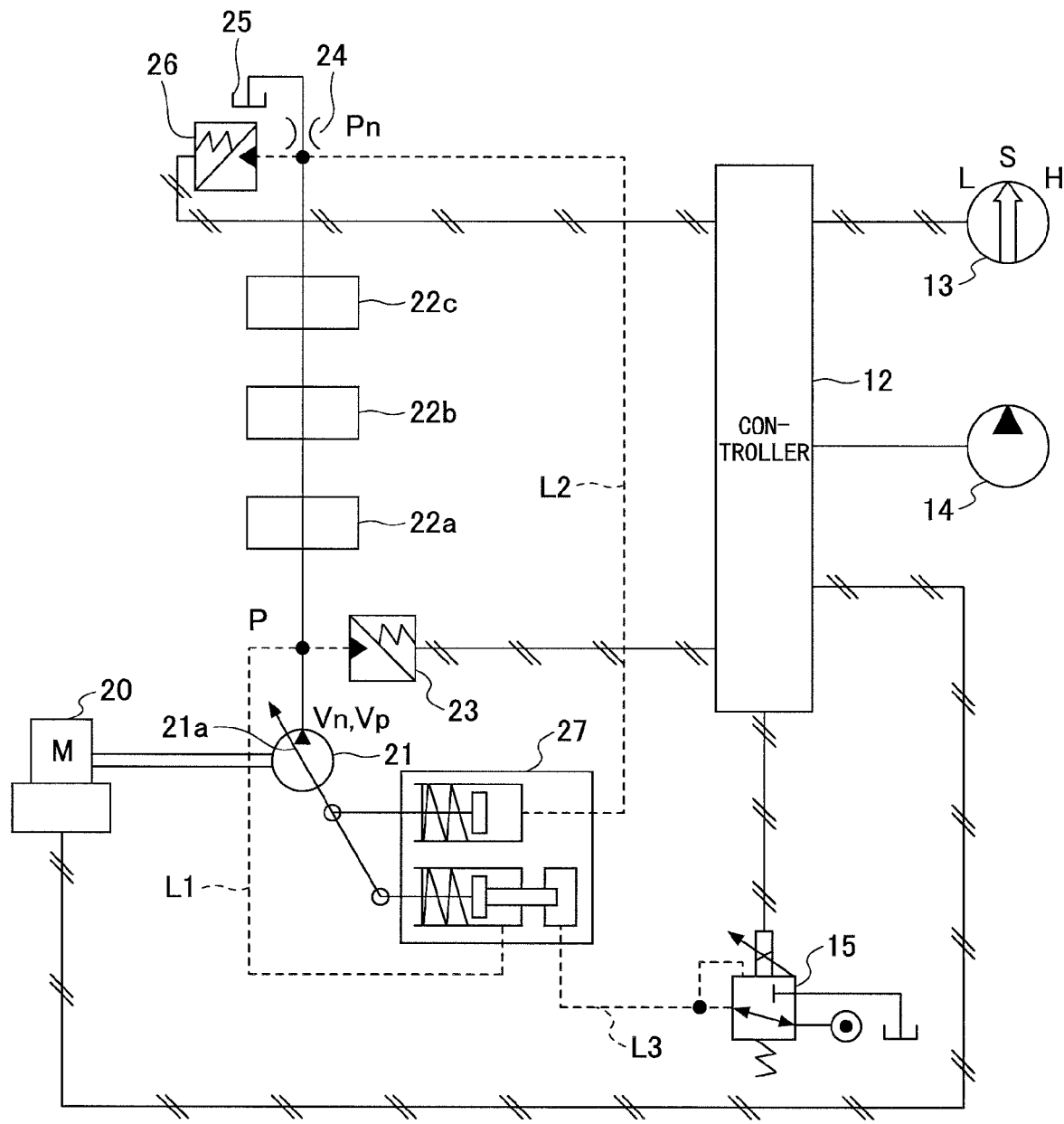
FIG. 3 illustrates a hydraulic circuit of the hybrid-type power shovel.

The structure of the hybrid-type power shovel illustrated in FIG. 3 is described. Switch valves 22a, 22b and 22c are connected to an oil passage of a variable displacement hydraulic pump (hereinafter, simply referred to as a hydraulic pump) which is driven by an engine motor including engine 30, the motor generator 34 and the splitter 32. By switching the switch valves 22a, 22b and 22c, the operating oil is supplied to cylinders of the boom, the arm and the travelling body to enable operations in the hydraulic loads. A pump discharge pressure sensor 23 is connected to the oil passage on the upstream side of the switch valve 22a. The pump discharge pressure sensor 23 detects the discharge pressure of the hydraulic pump 21. Further, on the downstream side of the switch valve 22c, the oil passage is connected to a tank 25 via a negative control metering valve (hereinafter, referred to as a nega-con metering valve) 24.

The variable displacement hydraulic pump 21 is, for example, a swash plate hydraulic pump. An output of the swash plate hydraulic pump can be changed by changing the tilting angle of a swash plate 21a. Specifically, if the discharge pressure P in the pump discharge pressure sensor 23 becomes greater than a predetermined value, the operating oil passes through the oil passage L1 and is supplied to the regulator 27 and functions in an angular direction of standing the swash plate 21a of the hydraulic pump 21. With this, the flow rate Q of the hydraulic pump 21 decreases. The negative control metering valve 24 is provided between the switch valve 22c and the tank 25 to limit the flow rate of the operating oil returning to the tank 25. On an upstream side of the negative control metering valve 24, the negative control sensor 26 is connected. The negative control sensor 26 is connected to the controller 12, and detects the hydraulic pressures of respective hydraulic pressure passages to the tank 25 to input the signals of the detected hydraulic pressures to the controller 12.

A negative controller (hereinafter referred to as a nega-con) including the negative control metering valve 24, the negative control sensor 26, and the controller 12 is a control system for reducing the loss of the discharge flow rate of the hydraulic pump 21 returning to the tank 25. Specifically, in a case where the hydraulic load is not in an operating state, said differently, there is no supplying the operating oil to the cylinders being the hydraulic load, the amount of the operating oil to be recovered to the tank 25 without being used for the operation becomes great. In this case, because the oil passage is choked by the negative control metering valve 24, the negative control pressure Pn becomes high. When the negative control pressure Pn becomes higher than a predetermined value, the operating oil is supplied to the regulator 27 to raise the swash plate 21a of the hydraulic pump 21. With this, when the hydraulic load is not in the operation state, the flow rate Q of the hydraulic pump 21 is decreased to restrict circulation of useless operating oil.

A mode selector 13 for switching to respective operation modes such as a heavy digging mode (an H mode), a standard digging mode (an S mode), and a finishing digging mode (a L mode) and a throttle volume 14 for setting the rotational speed of the engine are connected to the controller 12. Further, an electromagnetic proportional valve 15 and a pump discharge pressure sensor 23 are connected to the controller 12. Further, the electromagnetic proportional valve 15 is connected to a regulator 27, and the regulator 27 controls the discharge flow rate Q of the hydraulic pump 21. A pump control current I for adjusting the tilting angle of the swash plate 21a of the hydraulic pump 21 is detected by the electromagnetic proportional valve 15.

Ordinarily, the hydraulic shovel includes a switching mechanism for switching to respective modes such as the heavy digging mode (H mode), the standard digging mode (S mode), and the finishing digging mode (L mode). Said differently, by selecting the modes with the mode selector 13, the controller 12 switches to the corresponding operation modes. With the above described structure, the flow rate Q of the hydraulic pump 21 is controlled by the regulator 27 so that the power of the hydraulic shovel becomes constant. Further, the input power of the hydraulic pump 21 is changed by the electromagnetic proportional valve 15. At the same time, the revolution speed of the engine motor 20 is changed to switch the operation modes by the controller 12.

The controller 12 may be a part of the controller 42 illustrated in FIG. 2 or may be separate from the controller 42.

Next, a control of the engine revolution speed carried out in the hybrid-type power shovel of the first embodiment of the present invention is described. This engine revolution speed control is performed to reduce energy consumption in the hydraulic pump by decreasing the revolution speed of the engine 30 if it is determined that the hydraulic load is under a light load operation or does not perform an operation thereby excessively outputting the hydraulic pressure in comparison with a required output, hereinafter referred to as an excessive output state. It is determined whether the hydraulic load is under a light load and does not perform the operation by determining whether the negative control is being carried out. Said differently, if the hydraulic load is under a light load or does not perform the operation, the negative control is performed. Therefore, by determining whether the negative control is performed, it is possible to determine whether the hydraulic load is under a light load and will not perform the operation.

Figure 4:
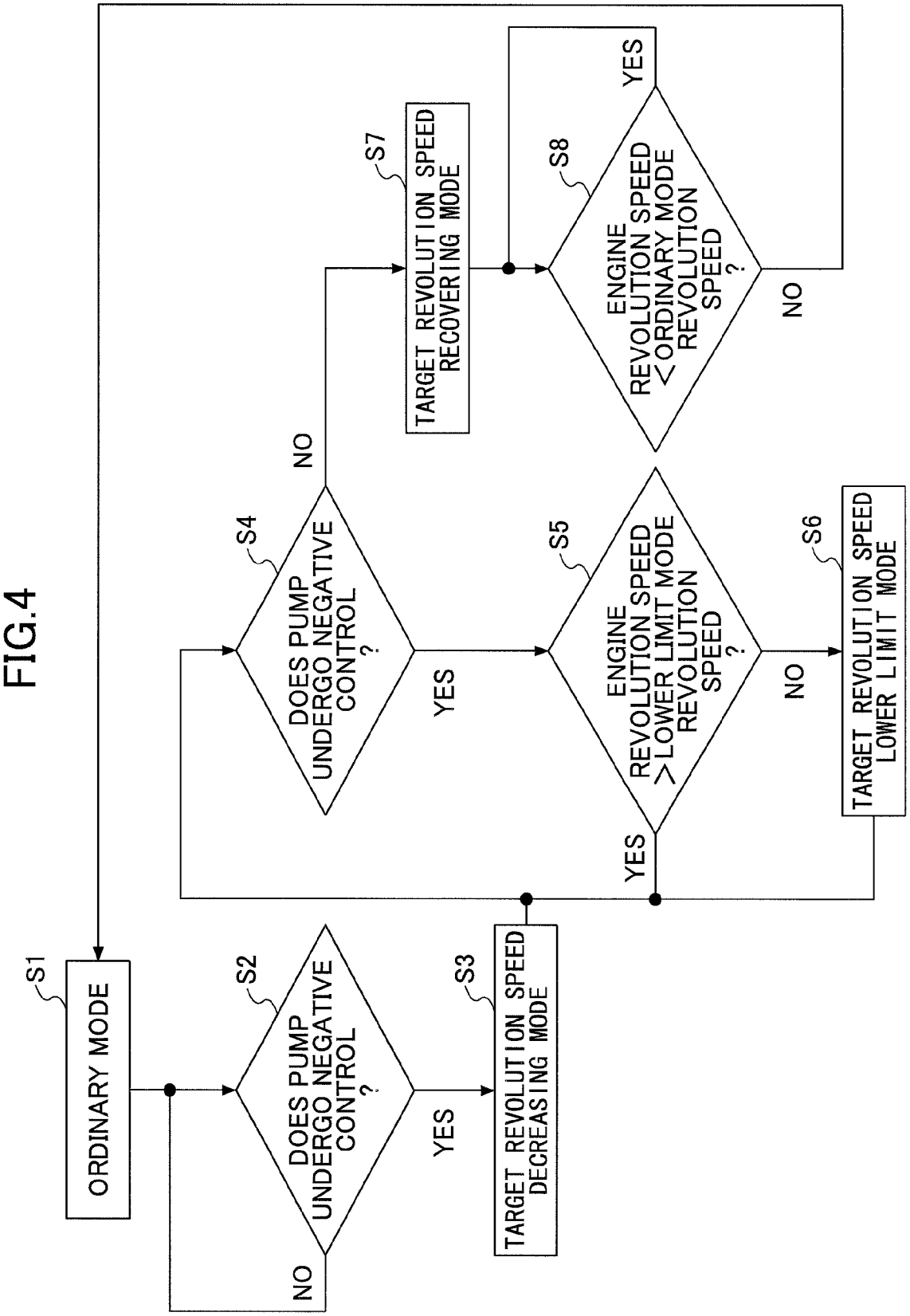
FIG. 4 is a flowchart of controlling the reduction of the revolution speed of the engine under a negative control of a first embodiment of the present invention.
Figure 5:
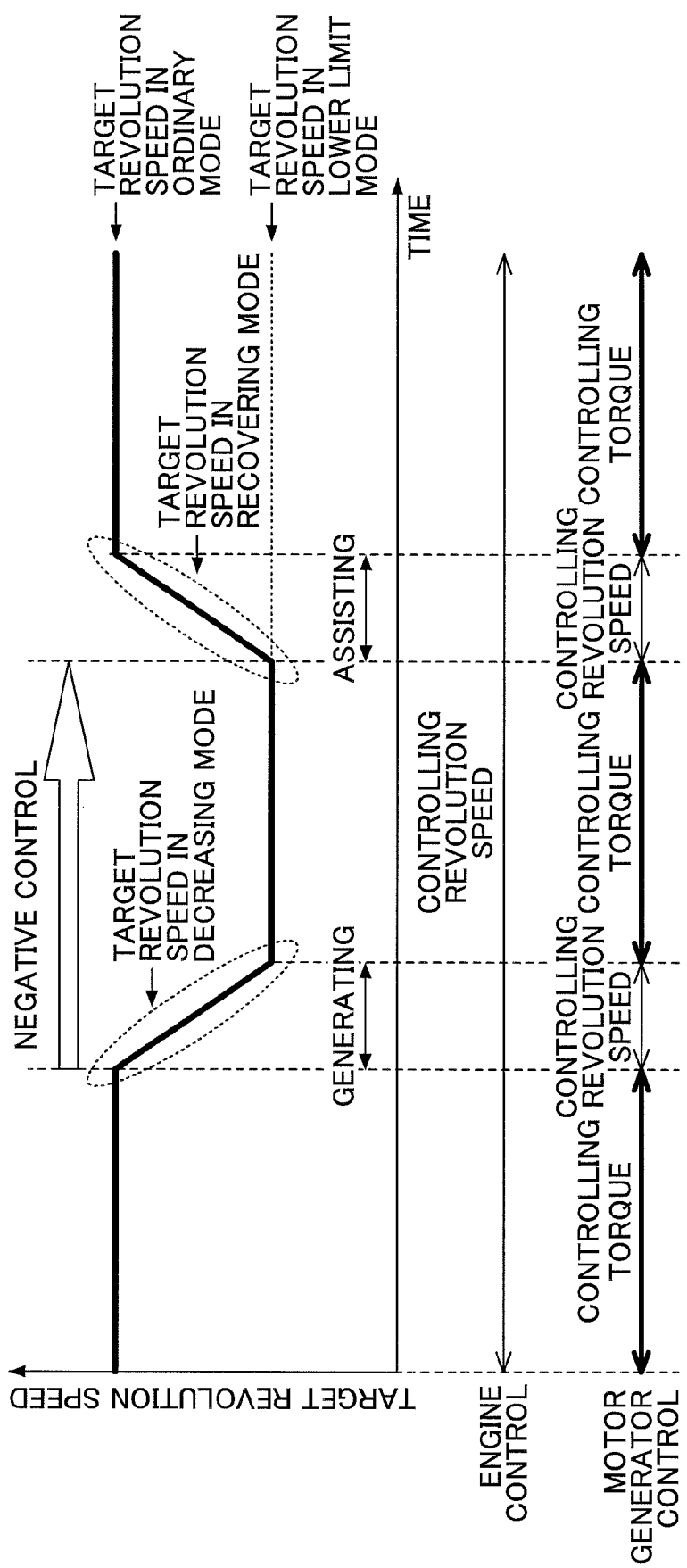
FIG. 5 is a graph illustrating the revolution speed of the engine under control illustrated in FIG. 4.

FIG. 4 is a flowchart of controlling the reduction of the revolution speed of the engine 30 while the negative control is performed. FIG. 5 is a graph illustrating the revolution speed of the engine 30 under control illustrated in FIG. 4.

In step S1, the engine 30 is operated to maintain a predetermined revolution speed by controlling the revolution speed. This state is referred to as an ordinary mode, and the above predetermined revolution speed of the engine 30 is referred to as an ordinary mode revolution speed. In the ordinary mode, the output control of the engine 30 is a revolution speed control (a speed control) and an output control of a motor generator 34 is a torque control. The ordinary mode is an operation state in which input energy is required for the hydraulic load during the operation.

In step S2, it is determined whether the hydraulic pump 21 undergoes the negative control. This determination is specifically carried out by comparing a discharge quantity Vp for power control acquired from the discharge pressure P of the hydraulic pump 21 with a discharge quantity Vn for negative control acquired from the negative control pressure Pn. When the negative control is performed, the output energy is discharged from the hydraulic load.

Figure 6:
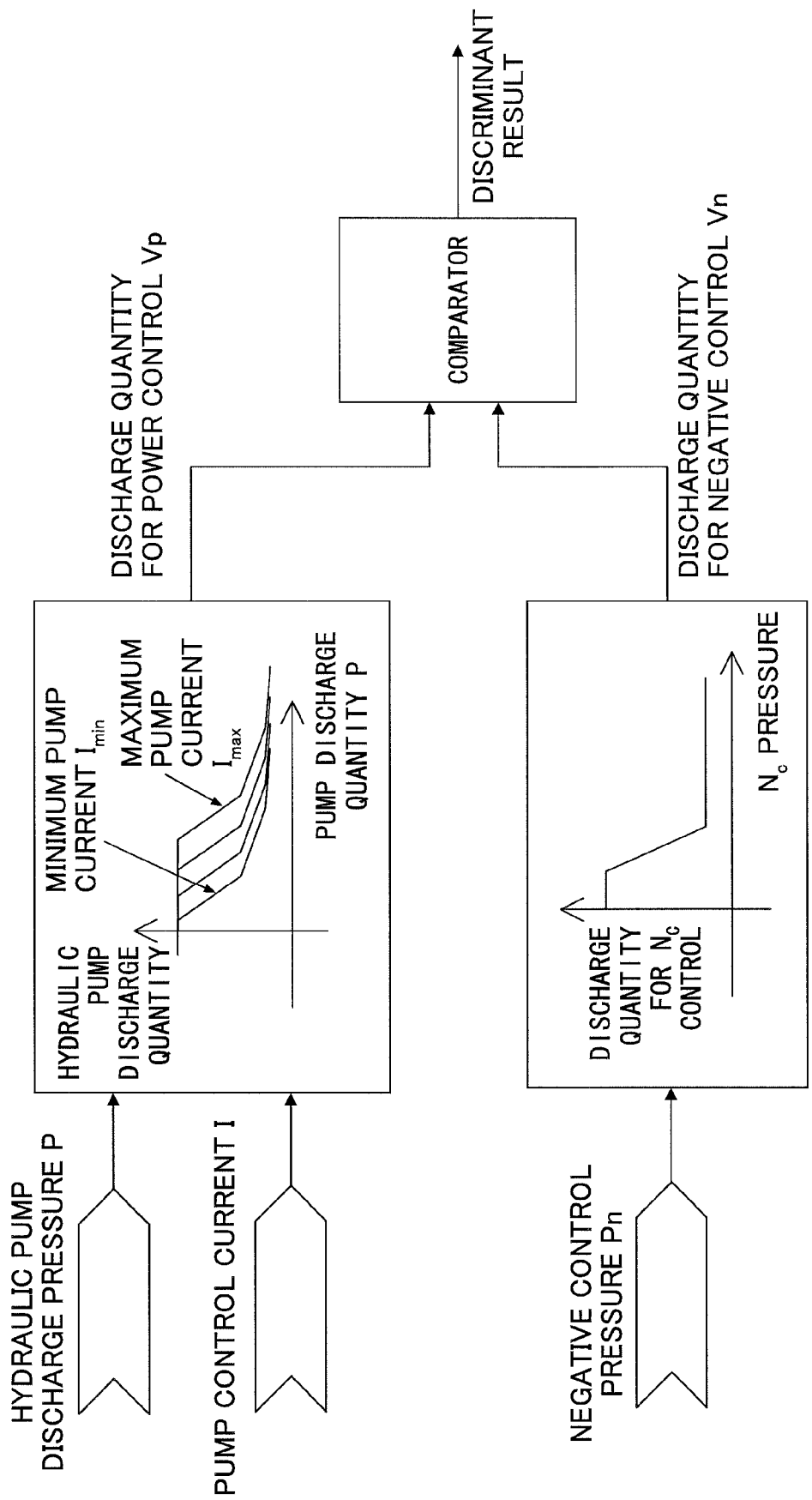
FIG. 6 is a functional block chart illustrating an exemplary discriminant method for the negative control.

FIG. 6 is a functional block chart illustrating an exemplary discriminant method for the negative control. First, a predetermined PQ line map of the hydraulic pump 21 is used to acquire the discharge quantity Vp for the power control from the discharge pressure P of the hydraulic pump 21 detected by the pump discharge pressure sensor 23 and the pump control current I controlling the tilting angle of the hydraulic pump 21. The discharge quantity for power control Vp corresponds to the discharge quantity of the oil which is supplied to the hydraulic load by the hydraulic pump 21. When the pump discharge pressure increases, the discharge pressure Vp is calculated to be small in accordance with the predetermined PQ line map of the hydraulic pump 21.

The discharge quantity Vn for the negative control is acquired from the detected negative control Pn detected by the negative control sensor 26 with reference to the previously acquired characteristic line map of the negative control pressure and the pump discharge quantity. The discharge quantity Vn for the negative control corresponds to the discharge quantity of the operating oil discharged from the hydraulic pump 21 while the negative control is carried out. According to the predetermined characteristic line map, if the negative control pressure Pn increases, the discharge quantity Vn for the negative control is designed to decrease.

Then, the acquired discharge quantity for power control Vp is compared to the discharge quantity for negative control Vn. If the discharge quantity Vn for the negative control is smaller than the discharge quantity for power control Vp, the negative control is performed to change the tilting angle of the hydraulic pump 21 so that the tilting angle conforms to the characteristics of the negative control pressure. Thus, it is determined that the discharge quantity of the hydraulic pump 21 is decreased. Said differently, if the discharge quantity Vn for the negative control is smaller than the discharge quantity Vp for the power control, it can be determined that the negative control is being performed.

If the discharge quantity Vn for the negative control is greater than the discharge quantity for power control Vp, the tilting angle of the hydraulic pump 21 corresponds to the characteristic of the main pressure by the hydraulic pressure supplied to the hydraulic load to realize an equal power control. Then, it is possible to determine that the discharge quantity of the hydraulic pump 21 is decreased. Said differently, if the discharge quantity Vn for the negative control is larger than the discharge quantity Vp for the power control, it can be determined that the equal power control is being performed. As described, it is possible to determine whether the negative control state exists by comparing the calculated discharge quantities Vp and Vn.

In step S2, it is determined whether the negative control is performed with the above described method. In step S2, if it is determined that the negative control is performed, the process returns to step S1. The revolution speed of the engine 30 is maintained to be a revolution speed in the ordinary mode. Meanwhile, if it is determined that the state of the hydraulic circuit is an excessive output state, the process goes to step S3.

In step S3, the revolution speed of the engine 30 is set to be in the decreasing mode. In the decreasing mode, the target revolution speed of the engine 30 is set to be lower than the ordinary mode revolution speed. At this time, the revolution speed of the engine 30 is decreased. However, response of the revolution speed by controlling the engine 30 is bad. Therefore, the revolution speed of the engine 30 does not reduce quickly. In the first embodiment, the motor generator 34 having a better rise responsiveness in controlling the revolution speed than that in the engine 30, is used to control the revolution speed of the engine 30 so as to decrease. The motor generator 34 is switched from the torque control to the revolution speed control (a speed control) thereby decreasing the revolution speed. The motor generator 34 generates electricity with motive energy of the engine 30. Said differently, the revolution speed of the motor generator 34 is controlled to be proportional to a target revolution speed of the engine. Simultaneously, the revolution speed is decreased with a better responsiveness than that in the engine 30. Thus, the motor generator 34 generates electricity using the engine 30 as a load.

In step S3, the decreasing mode is set. Then, in step S4, it is determined whether the negative control is still performed. If it is determined that the negative control is still performed in step S4, the process goes to step S5. In step S5, it is determined whether the revolution speed of the engine 30 is greater than a predetermined lower limit mode revolution speed. The lower limit mode revolution speed is lower than the ordinary mode revolution speed of the engine 30. For example, it is preferable to set as a revolution speed which cannot be further decreased in order to keep driving the engine 30.

In step S5, if it is determined that the revolution speed of the engine 30 is greater than the lower limit mode revolution speed, the process returns to step S4. Said differently, if the revolution speed of the engine 30 is not decreased to the lower limit mode revolution speed, the decreasing mode is maintained, and the determination in step S4 is performed. Because the decreasing mode is maintained, the revolution speed is subsequently decreased. Referring to FIG. 5, the target revolution speed in the decreasing mode is set in conformity with a predetermined gradient pattern. With this, the motor generator can be smoothly controlled, and it is further possible to prevent overshoot from occurring at a time of switching from a decreasing mode to an addition-subtraction mode. Further, by decreasing the revolution speed by controlling the revolution speed of the motor generator 34 and applying a load on the engine 30, the motor generator 34 can generate electricity. The electricity generated in the motor generator 34 can be charged in the electric power accumulator 38. Thus, energy saving operation can be realized with even better efficiency.

Meanwhile, in step S5, if it is determined that the revolution speed of the engine 30 is at the lower limit mode revolution speed or smaller, the process goes to step S6. Thus, the lower limit mode is set. In the lower limit mode, the revolution speed of the engine 30 is maintained to be the lower limit mode revolution speed. When the revolution speed of the engine 30 is continuously decreased in the decreasing mode, the engine 30 may not withstand as a result may stall. Therefore, the lower limit mode revolution speed is set so that the revolution speed does not further decrease. In step S6, the revolution speed of the engine 30 is controlled in the lower limit mode. The motor generator 34 resumes to perform the torque control which compensates the electric power accumulator 38 for electric power.

After the lower limit mode is set in step S6, determination in step S4 may be done. Said differently, after setting the lower limit mode in step S6, the process returns to step S4, and it is determined whether the pump pressure is a threshold value or smaller. Said differently, while the lower limit mode is maintained, it is determined whether the negative control is being performed.

In step S4, if it is determined that the hydraulic circuit is not in an excessive output state and the negative control is not performed (the hydraulic pump 21 is under equal power control), the process goes to step S7. Then, the lower limit mode ends and the recovering mode starts. In the recovering mode, the revolution speed of the engine is controlled to increase. Said differently, if the negative control is not performed, it is possible to determine that the equal power control is performed for supplying the hydraulic pressure to the hydraulic load. Therefore, the hydraulic pump 21 is controlled to be driven so that the revolution speed of the engine 30 is increased so as to be returned to the ordinary mode revolution speed.

In the recovering mode of the first embodiment, the motor generator 34 having a better rise responsiveness in controlling the revolution speed than that of the engine 30 is used to control a rapid increase of the revolution speed of the engine 30. When the motor generator 34 is switched from the torque control to the revolution speed control (the speed control) thereby increasing the revolution speed, the motor generator 34 assists the engine 30 to run as a motor. Said differently, the revolution speed of the motor generator 34 is controlled to be proportional to the target revolution speed of the engine 30. Simultaneously, the revolution speed is increased with a better responsiveness than that in the engine 30. Thus, the motor generator 34 runs as the motor to assist the engine. Even if the engine output is limited, the revolution speed is controlled by the motor generator 34. Therefore, the revolution speed of the engine 30 is smoothly recovered.

If the recovering mode is set in step S7, it is determined whether the revolution speed of the engine 30 is smaller than the ordinary mode revolution speed in step S8. In step S8, it is determined whether the revolution speed of the engine 30 returns to the ordinary mode revolution speed. If it is determined that the revolution speed of the engine 30 is smaller than the ordinary mode revolution speed in step S8, the recovering mode is maintained because the revolution speed of the engine 30 does not return to the revolution speed on the ordinary mode. As illustrated in FIG. 4, the revolution speed in the recovering mode is set in conformity with the predetermined gradient pattern in a similar manner to the decreasing mode. With this, the motor generator 34 can be smoothly controlled, and it is further possible to prevent overshoot from occurring at a time of switching from the recovering mode to the lower limit mode or the decreasing mode.

If it is determined that the revolution speed of the engine 30 is the ordinary mode revolution speed or greater in step S8, the process returns to step S1 and the ordinary mode is set up because the revolution speed of the engine 30 returns to the revolution speed on the ordinary mode.

If the revolution speed of the engine 30 is decreased during the above control, it may be requested to generate electricity from an electric load (e.g., the swivel motor 18). In this case, the engine 30 generates electricity by running the motor generator 34 while the revolution speed of the engine 30 is low. Thus, it is possible to respond to a request for electric power generation from the electric load. In the first embodiment, the revolution speed of the engine 30 is decreased under the state in which the negative control is performed. Thus, the operating oil discharge quantity of the hydraulic pump 21 is decreased. With this, it is possible to suppress unnecessary energy consumption by reducing the quantity of the operating oil supplied to the hydraulic circuit from the hydraulic pump 21. If the negative control is not performed, the revolution speed of the engine 30 is increased to be the ordinary mode revolution speed. Thus, the hydraulic pump 21 ordinarily supplies the hydraulic pressure. At this time, the engine revolution speed is increased and decreased by the control of the revolution speed of the motor generator 34 thereby enabling it to increase and decrease the revolution speed more rapidly than by the control of only the revolution speed of the engine 30.

In the first embodiment, it is determined whether the negative control is performed based on the discharge quantities Vp and Vn of the hydraulic pump 21 acquired from the characteristic line map in steps S2 and S4. However, it is possible to determine whether the negative control is performed based on the flow rate of the hydraulic pump 21 or the tilting angle of the hydraulic pump 21. The flow rate of the hydraulic pump 21 is acquired by multiplying the discharge quantity with the revolution speed. Therefore, the flow rate can be regarded the same as the discharge quantity in the above comparison. Further, when the negative control is performed, the tilting angle is constantly at maximum (the swash plate 21a is fully raised) to make the flow rate of the hydraulic pump 21 to be at minimum. Therefore, it is possible to determine that the negative control is being performed when the tilting angle is set at maximum. Because the tilting angle is set by the pump control current I, it is possible to determine whether the negative control is being performed based on the value of the pump limiting current. In the first embodiment, the engine revolution speed is maintained to be constant in the ordinary mode. However, the engine may be variably controlled in the ordinary mode.

In the first embodiment, it is determined that the hydraulic circuit is in an excessive output state by determining whether the negative control is being performed. The excessive output state of the hydraulic circuit is described further in detail.

An example of the operation performed by using the hybrid-type power shovel is described. Representative operations using the hydraulic power shovel in a digging and loading operation. The digging and loading operation is a sequential operation including a digging operation and a loading operation. Soil is dug out, scooped up and ejected to a predetermined place such as a loading platform of a damped motor lorry or the like.

Figure 7:
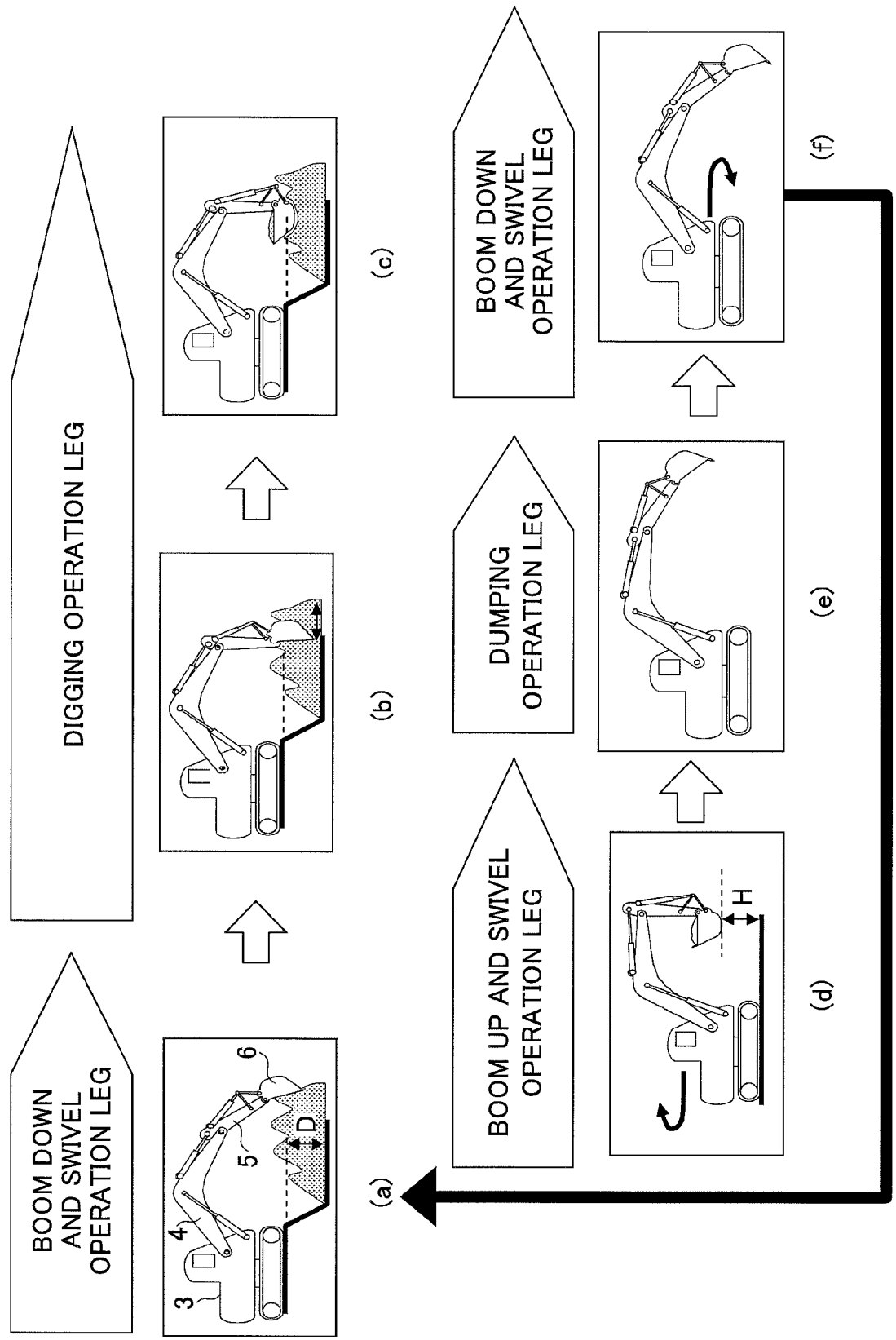
FIG. 7 illustrates digging and loading.

Referring to FIG. 7, the digging and loading operation is described in detail. Referring to FIG. 7(a), when the upper-part swiveling body 3 is swiveled, the bucket 6 is positioned above a digging position, and the arm 5 is opened and the bucket 6 is widely opened, and the operator lowers the boom 4 so that the tip of the bucket 6 reaches the target digging depth D. Ordinarily, the operator performs the swiveling and lowering of the boom and confirms the position of the bucket 6 through visual contact. Ordinarily, the upper-part swiveling body 3 is swiveled and simultaneously the boom 4 is lowered. The above operation is called boom-down and swivel, and this operation is performed during a boom-down and swivel operation leg.

If an operator determines that the tip end of the bucket 6 reaches the target digging depth D, a horizontal drawing operation is performed as in (b) of FIG. 7. In the horizontal drawing operation, the arm 5 is closed (retracted) until the arm becomes substantially perpendicular to the ground so that the tip end of the bucket 6 horizontally moves. With this horizontal drawing operation, a predetermined depth of soil is dug and collected by the bucket 6. After the horizontal drawing operation is completed, the bucket 6 is closed (tilted) until the angle between the edge line of the bucket 6 and the longitudinal axis of the arm 5 becomes 90° (90 degrees). Said differently, the bucket 6 is closed until the upper edge becomes horizontal and the collected soil is accommodated in the bucket 6. The above action is called a digging operation, and the digging operation is performed during a digging operation leg.

If the operator determines that the bucket 6 is closed until the longitudinal axis of the arm 5 becomes 90° (90 degrees), the boom 4 is lifted up until the bottom portion of the bucket 6 reaches a predetermined height H while the bucket 6 is closed. At this time or later, the bucket 6 is swiveled to reach a position where the soil is dumped. The above operation is referred to as boom-up and swivel operation, and this boom-up and swivel operation is performed during a boom-up and swivel operation leg.

If the operator determines that the boom-up and swivel operation is completed, the operator dumps the soil in the bucket by moving the arm 5 and the bucket 6 as illustrated in (e) of FIG. 7. This operation is called a dumping operation, and this dumping operation is performed during a dumping operation leg. In the dumping operation, the soil may be dumped by opening only the bucket 6.

If the operator determines that the dumping operation is completed, the upper-part swiveling body 3 may be swiveled to move the bucket 6 immediately above the digging position as illustrated in (f) of FIG. 7. At this time, the boom 4 is swiveled and simultaneously lowered to bring the bucket 6 to a starting position for digging. This operation is a part of the boom-down and swivel operation illustrated in (a) of FIG. 3. The operator lowers the bucket 6 from the starting position for digging to a target digging depth D as illustrated in (a) of FIG. 7, and a digging operation illustrated in (b) of FIG. 7 is performed again. A cycle of the "boom-down and swivel operation", the "digging operation", the "boom-up and swivel operation", the "dumping operation", the "boom-down and the "swivel operation" is repeated to dig and load the soil.

When the soil is dug and loaded as described above in the boom-down and swivel operation leg illustrated in (f) of FIG. 7, the hydraulic load is small and the negative control of the hydraulic pump may be frequently performed. Said differently, an excessive output state of the hydraulic circuit may frequently occur in the boom-down operation log.

Figure 8:
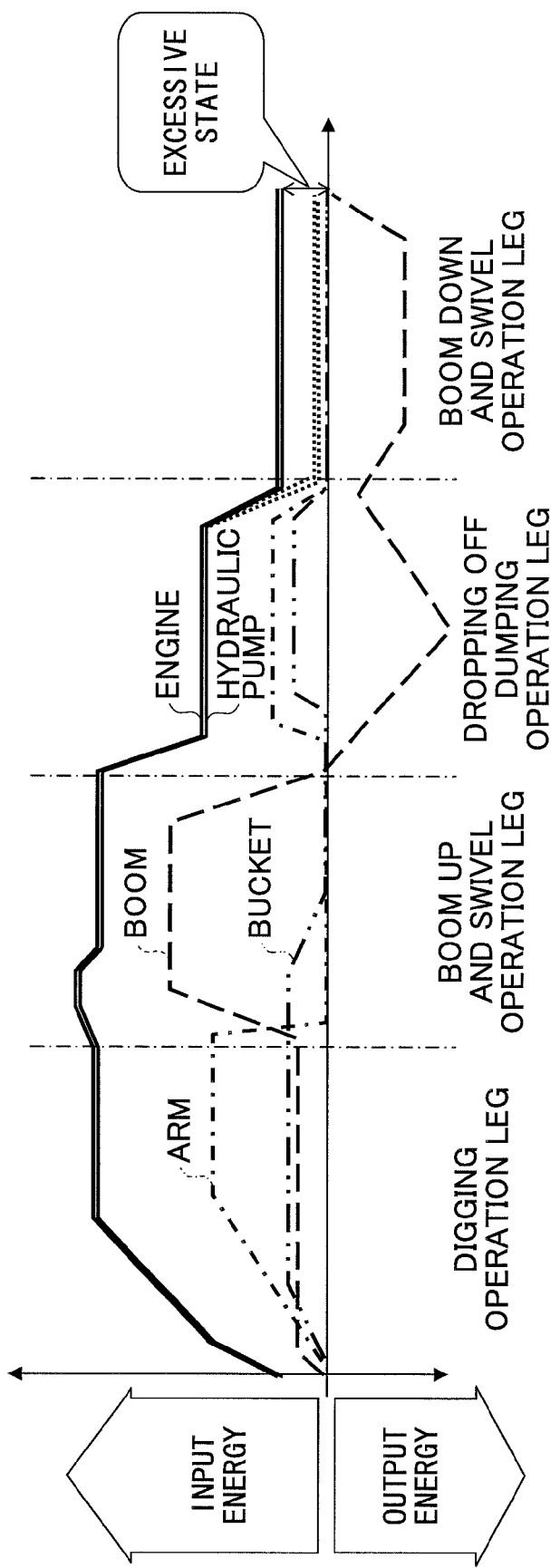
FIG. 8 is a graph illustrating changes of input and output energies of the hydraulic circuit during digging and loading operations.

FIG. 8 is a graph illustrating changes of input and output energies of the hydraulic circuit during digging and loading operation. Referring to FIG. 8, the input and output energy related to the boom cylinder 7 is indicated by a dashed line, the input and output energy related to the boom arm cylinder 8 is indicated by a dot chain line, and the input and output energy related to the bucket cylinder 9 is indicated by a two-dot chain line.

The output energy of the engine and the output energy of the hydraulic pump are indicated by solid lines.

However, the output energy of the engine and the output energy of the hydraulic pump which are obtained while the engine revolution speed is controlled are indicated by a dotted line in the boom-down and swivel operation leg. When the engine revolution speed control with the first embodiment is not performed, the output energy of the engine and the output energy of the hydraulic pump may become great in the boom-down and swivel operation leg. However, the output energy of the engine and the output energy of the hydraulic pump which are obtained while the engine revolution speed is controlled become very small as indicated by a dotted line in the boom-down and swivel operation leg. The arm 5 and the bucket 6 are not driven in boom-down and swivel operation leg and only the boom 4 is lowered. The boom 4 is lowered by the weights of the boom 4, the arm 5 and the bucket 6. Therefore, it is sufficient to supply hydraulic pressure necessary for supporting the weights of the boom 4, the arm 5 and the bucket 6. Therefore, in the boom-down and swivel operation leg, the energy input into the hydraulic circuit becomes very small and the operating oil is discharged from the boom cylinder 7. Therefore, the output energy becomes great. If the engine 30 is rotated at a predetermined revolution speed, the hydraulic pump 21 may rotate at a predetermined speed and output the hydraulic pressure. In this case, since the hydraulic pressure necessary for driving the hydraulic load is very small, the output of the hydraulic pump becomes greater than the hydraulic pressure necessary for driving the hydraulic load. Therefore, the boom-down and swivel operation log is in an excessive output state. Said differently, during actual operation, the hydraulic pressure necessary for the hydraulic load may be smaller than the required output of the hydraulic pump. In this case, the output of the hydraulic pump is in an excessive state.

In the first embodiment, when the hydraulic circuit is in the excessive output state, the revolution speed of the engine 30 is lowered to reduce the hydraulic output of the hydraulic pump 21 thereby suppressing the useless energy consumption.

Second Embodiment

Next, a control of the engine revolution speed carried out in a hybrid-type power shovel of a second embodiment of the present invention is described.

Figure 9:
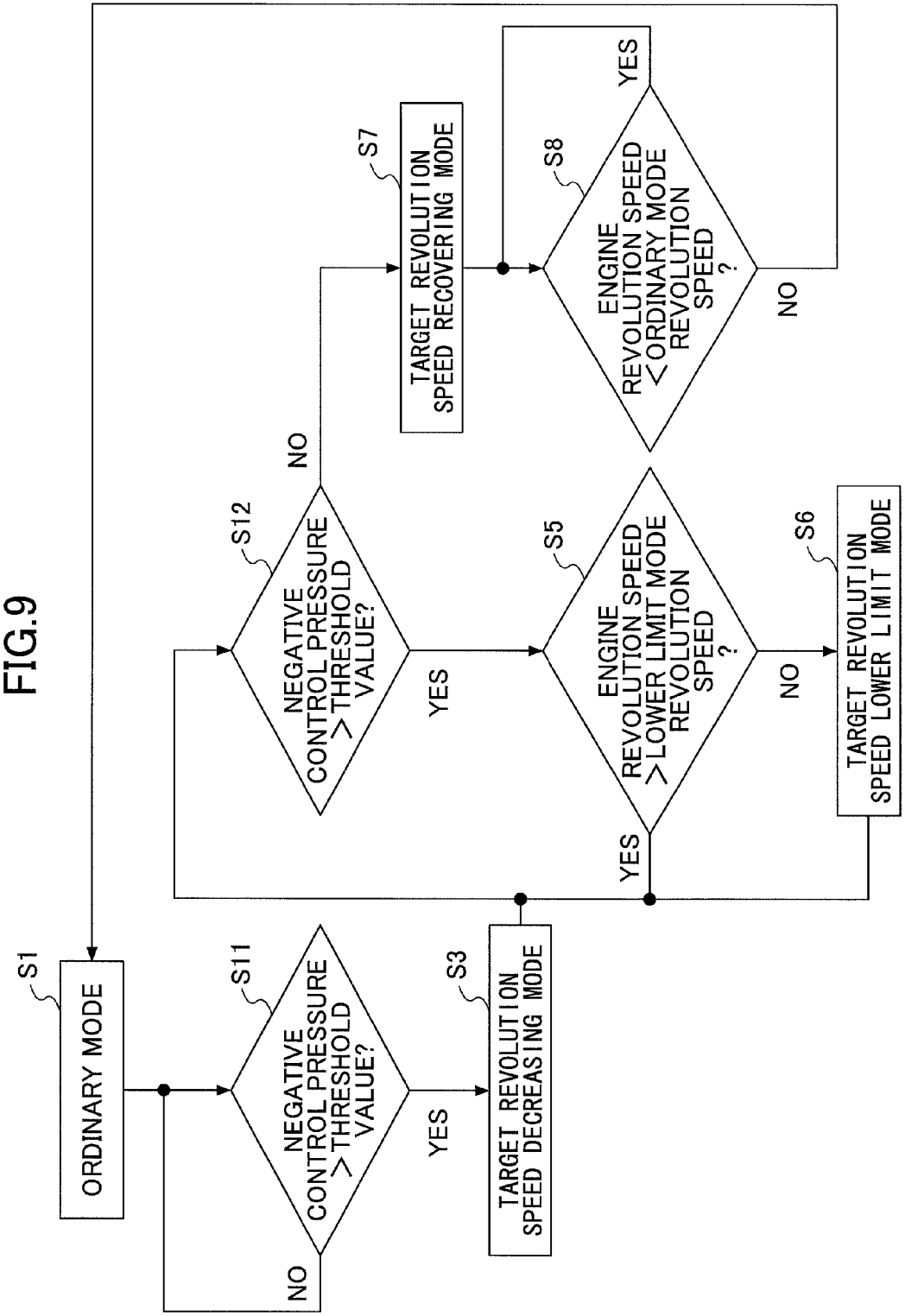
FIG. 9 is a flowchart of controlling the reduction of the revolution speed of the engine under the negative control of a second embodiment of the present invention.

FIG. 9 is a flowchart of controlling of the reduction of the revolution speed of the engine under negative control of the second embodiment of the present invention. Referring to FIG. 9, steps similar to those in FIG. 4 are indicated by the same step numbers in FIG. 4 and description of these is omitted.

In the second embodiment, the process illustrated in step S11 is performed after step S1 in which the ordinary mode is setup. In step S11, it is determined whether the negative control pressure Pn detected by the negative control sensor 26 is greater than a predetermined threshold value. The predetermined threshold value is previously set as the negative control pressure used at a time of starting the negative control. Therefore, the determination in step S11 can be regarded as the same as the determination in step S2 of FIG. 4. Therefore, if it is determined that the negative control pressure Pn detected in step S11 is greater than the threshold value, it is determined that the hydraulic circuit is in an excessive output state and the negative control is being performed. Then, the process goes to step S3 to set a decreasing mode. Subsequently, a process of step S12 is performed instead of step S4. In step S12, it is determined whether the negative control pressure Pn detected by the negative control sensor 26 is greater than a predetermined threshold value. If it is determined that the negative control pressure Pn is greater than the threshold value in step S12, it is possible to determine that the negative control is being performed. Therefore, the determination in step S12 can be regarded the same as the determination in step S4 of FIG. 4. By setting the threshold value relative to the negative control pressure Pn as described above, it becomes unnecessary to input pump characteristics such as a PQ line map and it is possible to determine whether there is a negative control state with a simple method. The processes in step S5 and the subsequent steps are the same and description of these are omitted.

In the second embodiment, the revolution speed of the engine 30 is decreased under the state in which the negative control is performed. Thus, the operating oil discharge quantity of the hydraulic pump 21 is decreased. With this, it is possible to suppress unnecessary energy consumption by reducing the quantity of the operating oil supplied to the hydraulic circuit from the hydraulic pump 21. If the negative control is not performed, the revolution speed of the engine 30 is increased to be the ordinary mode revolution speed. Thus, the hydraulic pump 21 ordinarily supplies the hydraulic pressure. At this time, the engine revolution speed is increased and decreased by the control of the revolution speed of the motor generator 34 thereby enabling it to rapidly increase and decrease the revolution speed more rapidly than by the control of only the revolution speed of the engine 30.

Although the number of the hydraulic pump 21 is one in the first and second embodiments, the present invention is not limited to the number and applicable to a hydraulic circuit including two or more hydraulic pumps.

With the above explanation, the hydraulic pump 21 is controlled and driven with the negative control (i.e., the negacon). There are other applicable drive and control methods called a positive control (i.e., the posi-con) and a load sensing control. The controls of the first and second embodiments may be the negative control of the hydraulic pump 21 or the positive control of the hydraulic pump 21.

Third Embodiment

Figure 10:
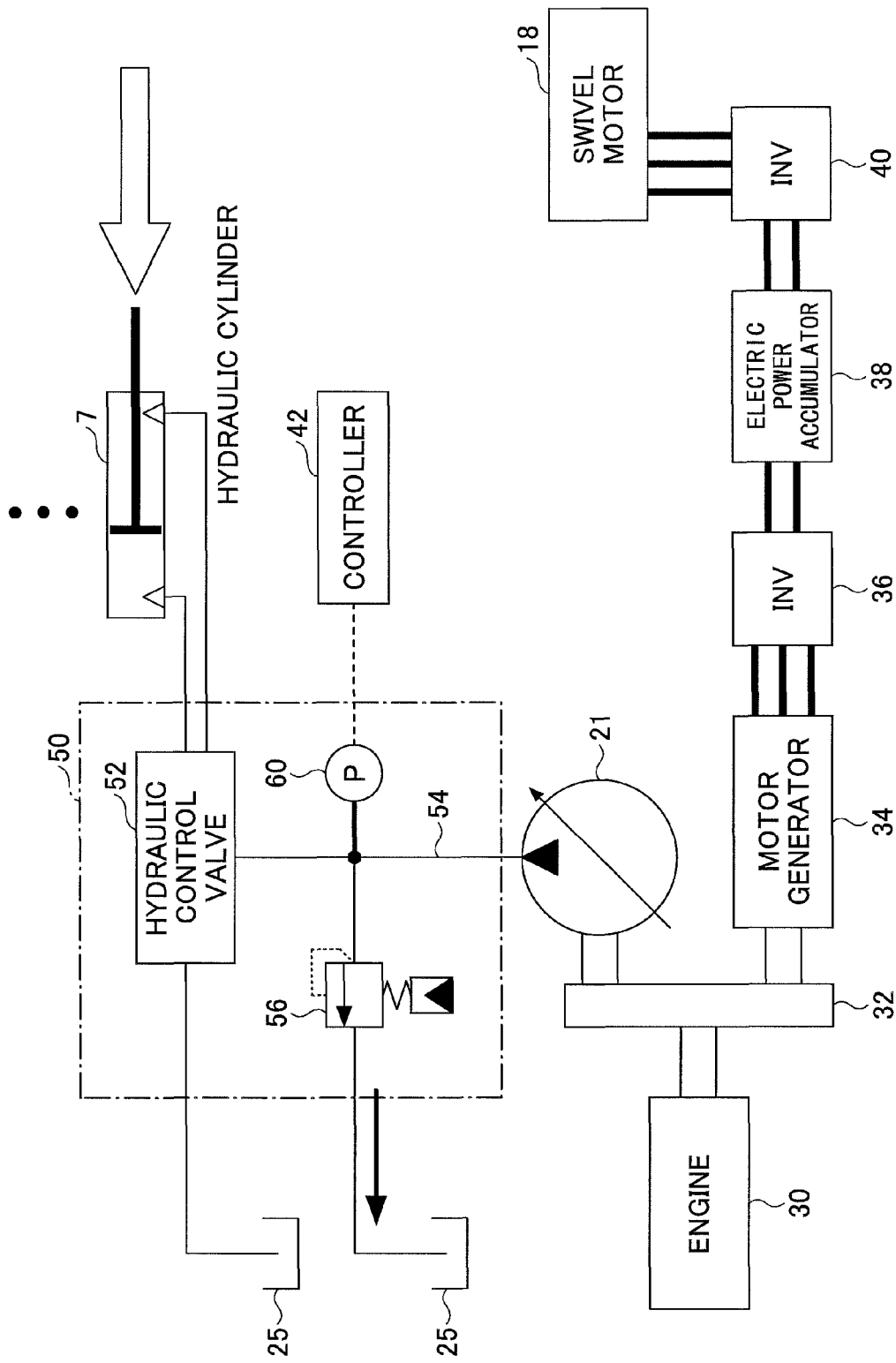
FIG. 10 is a block chart illustrating the structure of a drive-train of a hybrid-type power shovel of a third embodiment.

Next, the hybrid-type power shovel of a third embodiment is described. FIG. 10 is a block chart illustrating the structure of a drive-train of a hybrid-type power shovel of the third embodiment.

The hybrid-type power shovel of the third embodiment includes an engine 30 as a power source and a motor generator 34 for assisting the engine 30. The output shaft of the motor generator 34 is connected to the output shaft of the engine 30 via a splitter (a transmission) 32. Therefore, the revolution speed of the motor generator 34 is proportional to the revolution speed of the engine 30. The hydraulic pump 21 generating hydraulic pressure is connected to the output shaft of the engine 30 via the splitter 30. Therefore, the hydraulic pump 21 is driven by the engine 30 and/or the motor generator 34 so as to pressurize and discharge the operating oil. With the third embodiment, the hydraulic pump 21 is a variable displacement pump such as a swash plate pump. However, the hydraulic pump 21 is not limited to the variable displacement pump. The motor generator 34 is connected to the electric power accumulator 38 via the inverter 36. The electric power accumulator 38 is a power supply unit including a battery and supplies electric power to the motor generator 34 via the inverter 36 to make the motor generator 34 run as a motor (assisting). When the motor generator generates electricity, the generated electric power is supplied to the electric power accumulator 38 via the inverter 36 and accumulated.

In the third embodiment, the swivel mechanism 2 is driven by the swivel motor (an electric motor) 18 to swivel the upper-part swiveling body 3. The swivel motor 18 is connected to the electric accumulator 38 via the inverter 40 and driven by electricity supplied from the electric power accumulator 38. The swivel motor 18 is an electric motor which can generate electricity and the generated electricity is accumulated in the electric power accumulator 38 via the inverter 40. The hydraulic circuit 50 is connected to the discharge port of the hydraulic pump 21. The hydraulic circuit 50 includes a hydraulic control valve 52. The hydraulic cylinders such as the boom cylinder 7, the arm cylinder 8 and the bucket cylinder 9 are connected to the hydraulic control valve 52. Referring to FIG. 10, only the boom cylinder 7 is illustrated as the hydraulic load. Pressurized operating oil to be discharged from the hydraulic pump 21 passes through the hydraulic circuit 50 and is supplied to the boom cylinder 7, the arm cylinder 8, the bucket cylinder 9 and a traveling motor (not illustrated) via the hydraulic control valve 52. A relief valve 56 is connected to the middle of a hydraulic piping 54 between the discharge port of the hydraulic pump 21 and the hydraulic control valve 52. Therefore, the operating oil is supplied from the hydraulic piping 54 to the relief valve 56. If the pressure of the operating oil increases more than a predetermined pressure, the relief valve 56 automatically opens. The operating oil from the hydraulic piping 54 flows through the relief valve 56 and returns to the tank 25. In the middle of the hydraulic piping 54, a pressure sensor 60 is provided as a pressure detector. The pressure sensor 60 detects the pressure of the operating oil in the hydraulic piping 54 and supplies the detected pressure to the controller 42. The controller 42 includes a computer including a CPU, a ROM and a RAM. The controller 42 controls an entire hybrid-type power shovel. Referring to FIG. 10, for example, there may occur a state in which the bucket is pushed down to the ground and the boom cannot work when the boom cylinder 7 is driven for the operation. In this case, if hydraulic pressure is continuously supplied to the boom cylinder 7, the hydraulic pressure in the hydraulic circuit 50 to the boom cylinder 7 may excessively increase. Therefore, if the hydraulic pressure in the hydraulic piping 54 of the hydraulic circuit 50 reaches a predetermined relief pressure, the relief valve 56 automatically opens to release the hydraulic pressure (return the high pressure operating oil to the tank 25). Thus, parts of the hydraulic circuit 50 and the hydraulic piping can be prevented from bursting.

When the operating oil is returned to the tank 25 via the relief valve 56, the operating oil which is suctioned from the tank 25 and highly pressurized is returned to the tank 25 without using it. Therefore, the hydraulic pump 21 is unnecessarily driven. This problem occurs because the engine 30 is maintained to rotate at a predetermined revolution speed (a revolution speed in the ordinary mode) and therefore the hydraulic pump 21 directly connected to the engine 30 is driven at a revolution speed in proportion to the ordinary mode revolution speed of the engine 30.

In the third embodiment, when the hydraulic pump is unnecessarily driven while the relief valve 56 is opened as the hydraulic pump is being unnecessarily driven, the revolution speed of the engine 30 is decreased to thereby reduce the revolution speed of the hydraulic pump 21. Thus, the quantity of the unnecessary operating oil discharged from the hydraulic pump 21 can be decreased. Said differently, by decreasing the revolution speed of the engine 30 to be a revolution speed lower than the ordinary mode revolution speed while the relief valve 56 is opened, the revolution speed of the hydraulic pump 21 is decreased to make the unnecessary discharge quantity of the operating oil as less as possible.

Figure 11:
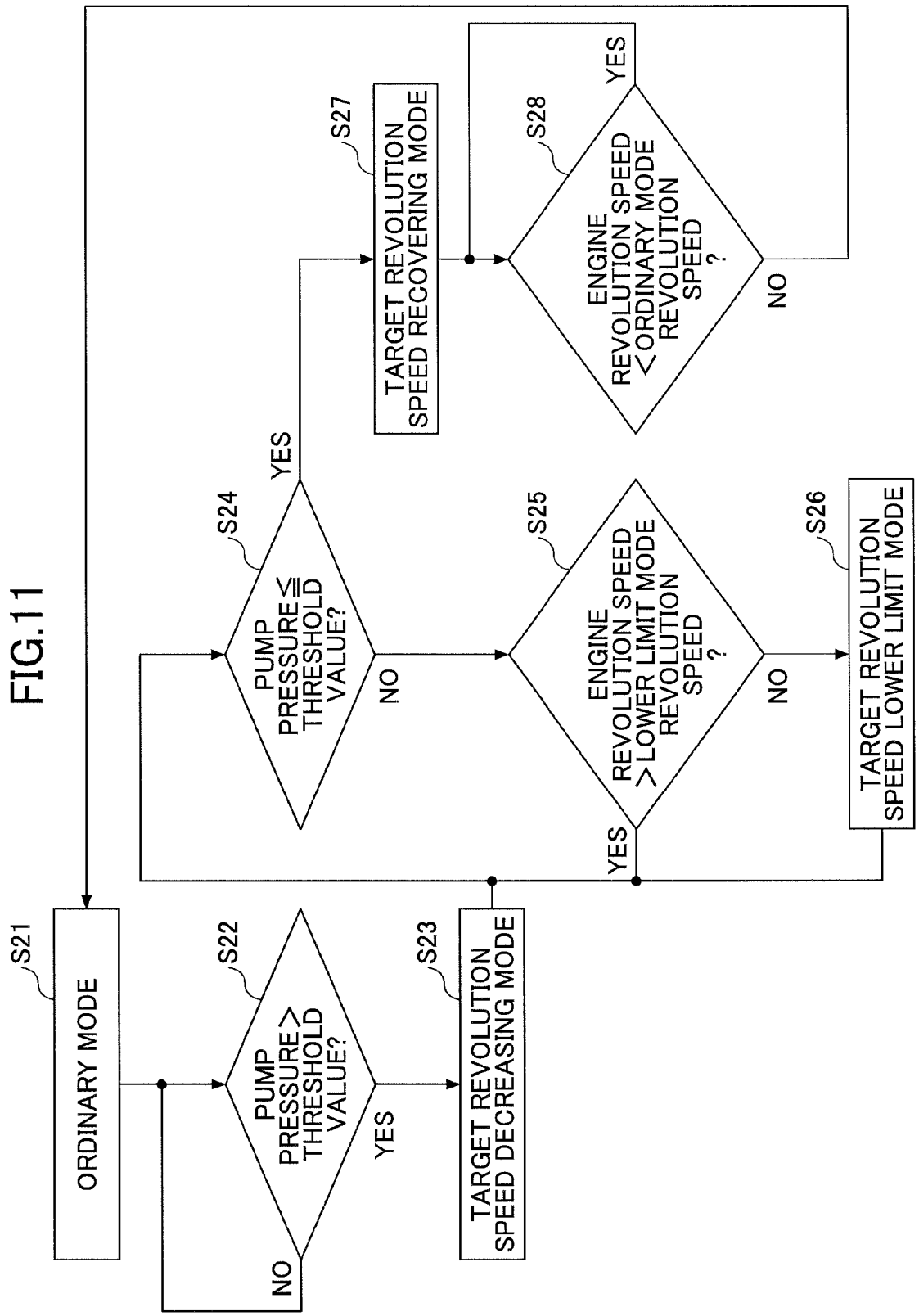
FIG. 11 is a flowchart of controlling the reduction of the revolution speed of the engine when a relief valve is opened.
Figure 12:
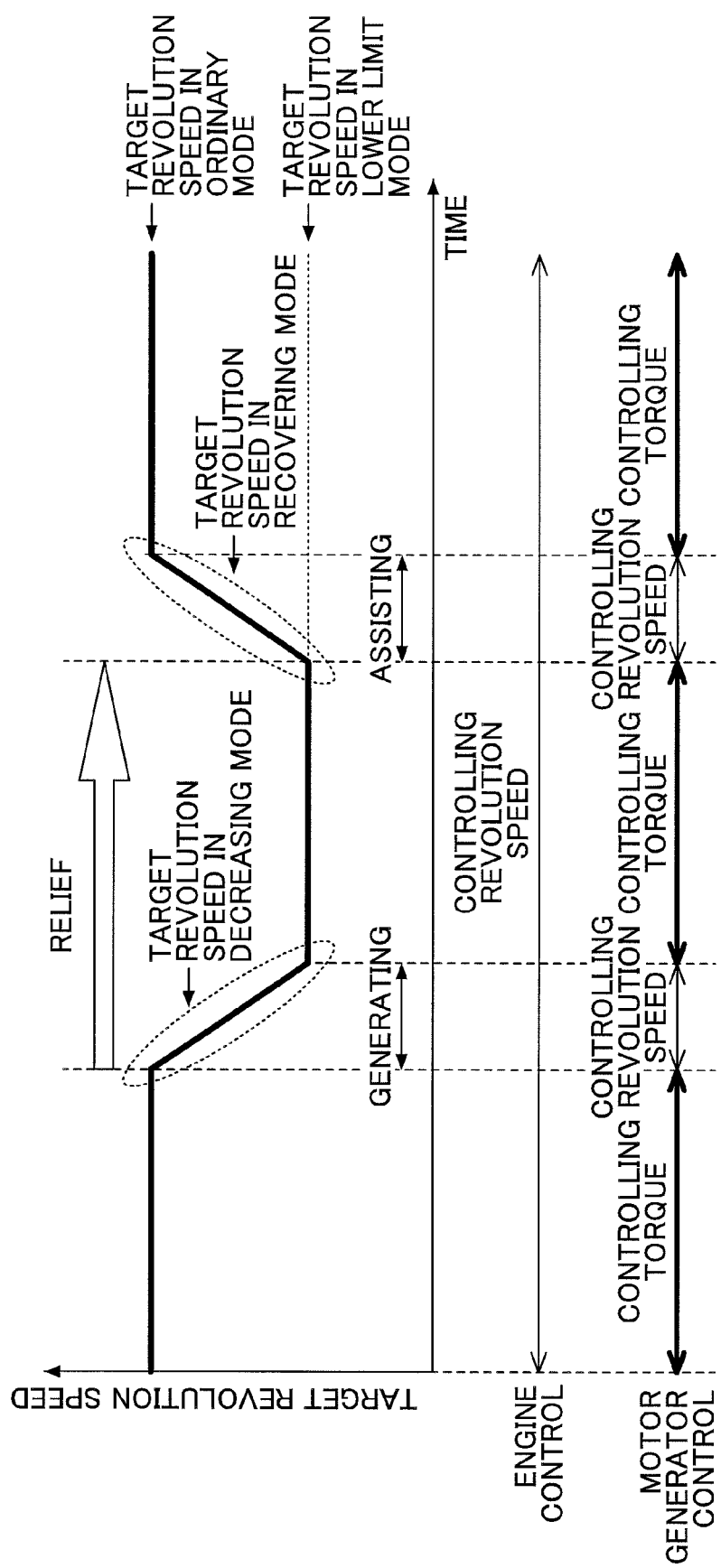
FIG. 12 is a graph illustrating the revolution speed of the engine under the control illustrated in FIG. 11.

FIG. 11 is a flowchart of a control of reducing the revolution speed of the engine 30 when the relief valve 56 is opened. FIG. 12 is a graph illustrating the revolution speed of the engine 30 under the control illustrated in FIG. 11.

In step S21, the hydraulic circuit 50 ordinarily operates in step S21. The relief valve 56 is closed and engine 30 is driven to maintain a predetermined revolution speed. This state is referred to as an ordinary mode, and the above predetermined revolution speed of the engine 30 is referred to as an ordinary mode revolution speed. In the ordinary mode, output control of the engine 30 is the revolution speed control (a speed control) and output control of the motor generator 34 is torque control. The ordinary mode is an operation state in which input energy is required for the hydraulic load during the operation.

In step S22, it is determined whether the pressure (pump pressure) of the operating oil discharged from the hydraulic pump 21 exceeds a predetermined threshold value. At this time, a detection value from the pressure sensor 60 is used. The predetermined threshold value is a relief pressure, which is a pressure value at a time of opening the relief valve 56. In step S22, if it is determined that the pump pressure does not exceed the threshold value, the process returns to step S21. The revolution speed of the engine 30 is maintained to be the ordinary mode revolution speed. Meanwhile, if it is determined that the pump pressure exceeds the threshold value in step S22, the process goes to step S23. When the pump pressure exceeds the threshold value, the output energy is emitted from the hydraulic load.

In step S23, the revolution speed of the engine 30 is set to be in the decreasing mode. In the decreasing mode, the target revolution speed of the engine 30 is set to be lower than the ordinary mode revolution speed. At this time, the revolution speed of the engine 30 is decreased by the revolution speed control. However, response of the revolution speed controlling the engine 30 is bad. Therefore, the revolution speed of the engine 30 does not quickly decrease. In the third embodiment, the motor generator 34 having better rise responsiveness in controlling the revolution speed than that in the engine 30 is used to control the revolution speed of the engine 30 so as to quickly decrease. The motor generator 34 is switched from the torque control to the revolution speed control (the speed control) thereby decreasing the revolution speed. The motor generator 34 generates electricity with motive energy of the engine 30. Said differently, the revolution speed of the motor generator 34 is controlled to be proportional to the target revolution speed of the engine. Simultaneously, the revolution speed of the motor generator 34 is decreased with a better responsiveness than that in the engine 30. Thus, the motor generator 34 generates electricity as a load of the engine 30.

In step S23, the decreasing mode is set. Then, in step S24, it is determined whether the pump pressure becomes the threshold value or less. Said differently, it is determined whether the hydraulic pressure in the hydraulic circuit 50 becomes the relief pressure or less and the relief valve 56 is closed. If it is determined that the pump pressure is not the threshold value or less in step S24, the relief valve 56 is opened and the operating oil discharged from the hydraulic pump 21 is still returned to the tank 25. Subsequently, in step S25, it is determined whether the revolution speed of the engine 30 is greater than a predetermined lower limit mode revolution speed. The lower limit mode revolution speed is lower than the ordinary mode revolution speed of the engine 30. For example, it is preferable to set the lower limit mode revolution speed to be a revolution speed which should not be decreased in order to keep driving the engine 30.

In step S25, if it is determined that the revolution speed of the engine 30 is greater than the lower limit mode revolution speed, the process returns to step S24. Said differently, if the revolution speed of the engine 30 is not decreased to the lower limit mode revolution speed, the decreasing mode is maintained, and the determination in step S24 is performed. Because the decreasing mode is maintained, the revolution speed of the engine 30 is subsequently decreased. As illustrated in FIG. 12, the revolution speed in the decreasing mode is set in conformity with a predetermined gradient pattern. With this, the motor generator 34 can be smoothly controlled, and it is further possible to prevent overshoot from occurring at a time of switching from a decreasing mode to an addition-subtraction mode. Further, in decreasing the revolution speed by controlling the revolution speed of the motor generator 34 and applying the load on the engine 30, the motor generator 34 can generate electricity. The electric power accumulator 38 may be charged with the electricity generated by the motor generator 34. Thus, energy saving operation can be realized with even better efficiency.

Meanwhile, in step S25, if it is determined that the revolution speed of the engine 30 is at the lower limit mode revolution speed or smaller, the process goes to step S26. Thus, the lower limit mode is set. In the lower limit mode, the revolution speed of the engine 30 is maintained to be the lower limit mode revolution speed. When the revolution speed of the engine 30 is continuously decreased in the decreasing mode, the engine 30 may not withstand the load and as a result may stall. Therefore, the lower limit mode revolution speed is set so that the revolution speed does not further decrease. In step S26, the revolution speed of the engine 30 is controlled in the lower limit mode. The motor generator 34 resumes performing the torque control which compensates the electric power accumulator 38 for electric power.

After the lower limit mode is set in step S26, determination in step S24 may be done. Said differently, after setting the lower limit mode in step S26, the process returns to step S24, and it is determined whether the pump pressure is the threshold value or smaller. Said differently, while the lower limit mode is maintained, it is determined whether the operating oil is returned to the tank by opening the relief valve 56.

If it is determined that the pump pressure is the threshold value or smaller in step S24, the process goes to step S27. Then, the lower limit mode is released to set a recovering mode. In the recovering mode, the revolution speed of the engine 30 is controlled to increase. Said differently, if the pump pressure becomes the threshold value or smaller, the relief valve 56 is closed so that the operating oil is not returned to the tank. In this case, there is a probability that the boom cylinder 7 moves to require the hydraulic pressure again. Therefore, the revolution speed of the engine 30 is increased to return to the ordinary mode revolution speed to thereby control driving the hydraulic pump 21.

In the recovering mode of the first embodiment, the motor generator 34 having a better rise responsiveness in controlling the revolution speed than that in the engine 30 is used to control the revolution speed of the engine 30 so as to rapidly increase. When the motor generator 34 is switched from the torque control to the revolution speed control (the speed control) thereby increasing the revolution speed, the motor generator 34 assists the engine 30 to run as the motor. Said differently, the revolution speed of the motor generator 34 is controlled to be proportional to the target revolution speed of the engine 30. Simultaneously, the revolution speed is increased with a better responsiveness than that in the engine 30. Thus, the motor generator 34 runs as the motor to assist the engine. Even if the engine output is limited, the revolution speed is controlled by the motor generator 34. Therefore, the revolution speed of the engine 30 is smoothly recovered.

If the recovering mode is set in step S27, it is determined whether the revolution speed of the engine 30 is smaller than the ordinary mode revolution speed in step S28. In step S28, it is determined whether the revolution speed of the engine 30 returns to the ordinary mode revolution speed. If it is determined that the revolution speed of the engine 30 is the ordinary mode revolution speed or smaller in step S28, the recovering mode is maintained because the revolution speed of the engine 30 does not return to the ordinary mode revolution speed. As illustrated in FIG. 5, the recovering mode revolution speed is set in conformity with the predetermined gradient pattern in a similar manner to the decreasing mode. With this, the motor generator 34 can be smoothly controlled, and it is further possible to prevent overshoot from occurring at a time of switching from the recovering mode to the lower limit mode or the decreasing mode.

If it is determined that the revolution speed of the engine 30 is the ordinary mode revolution speed or greater in step S28, the process returns to step S21 and the ordinary mode is set up because the revolution speed of the engine 30 returns to the ordinary mode revolution speed.

If the revolution speed of the engine 30 is decreased during the above control, it may be requested to generate electricity from an electric load (e.g., the swivel motor 18). In this case, the engine 30 generates electricity by running the motor generator 34 while the revolution speed of the engine 30 is low. Thus, it is possible to respond to the request for the electric power generation from the electric load.

In the third embodiment, the revolution speed of the engine 30 is decreased under the state in which the relief valve 56 is being opened. Thus, the discharge quantity of the operating oil from the hydraulic pump 21 is decreased. With this, it is possible to suppress unnecessary energy consumption by decreasing the quantity of the operating oil supplied to the hydraulic circuit from the hydraulic pump 21. If the relief valve 56 is closed, the revolution speed of the engine 30 is increased to be the ordinary mode revolution speed. Thus, the hydraulic pump 21 ordinarily supplies the hydraulic pressure. At this time, the revolution speed of the engine 30 is increased and decreased by the control of the revolution speed of the motor generator 34 thereby enabling to increase and decrease the revolution speed more rapidly than by the control of only the revolution speed of the engine 30. In the third embodiment, the engine revolution speed is maintained to be constant in the ordinary mode. However, the revolution speed of the engine may be variably controlled in the ordinary mode.

Fourth Embodiment

Figure 13:
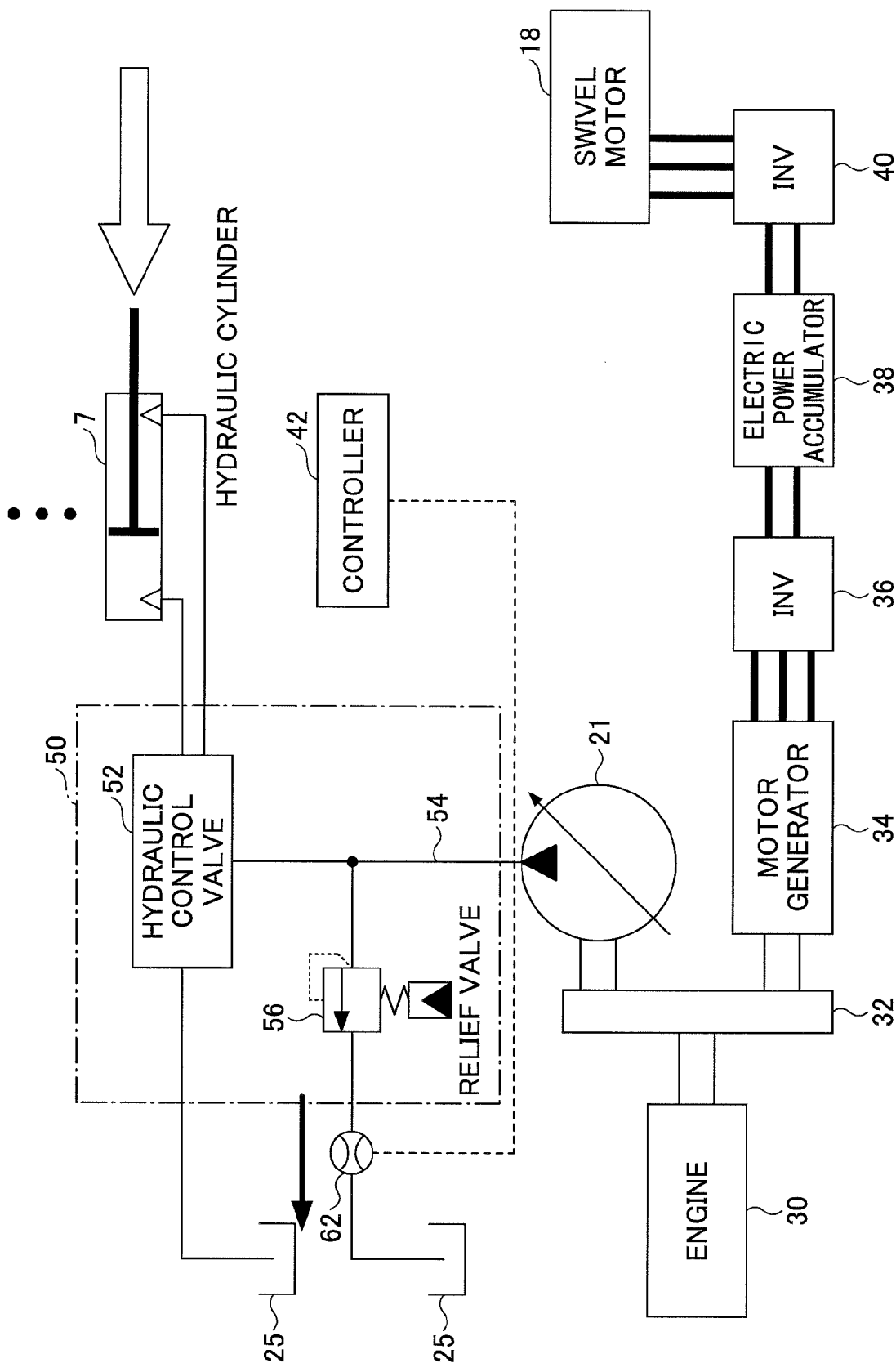
FIG. 13 is a block chart illustrating the structure of a drive-train of a hybrid-type power shovel of a fourth embodiment.

Next, the hybrid-type power shovel of a fourth embodiment is described. FIG. 13 is a block chart illustrating the structure of a drive-train of a hybrid-type power shovel of the fourth embodiment. Referring to FIG. 13, the same reference symbols as those illustrated in FIG. 10 are attached to the same components as those illustrated in preceding figures, and description of those is omitted.

The hybrid-type power shovel of the fourth embodiment has a similar structure to that in the hybrid-type power shovel of the third embodiment illustrated in FIG. 10. However, a structure of determining whether the pump pressure is greater than the threshold value is different from that in the third embodiment. With the fourth embodiment, it is determined whether the pump pressure is greater than the threshold value by detecting whether the operating oil has already returned from the relief valve 56 to the tank 25 without detecting the pump pressure with the pressure sensor 60. Therefore, instead of providing the pressure sensor to the hydraulic piping 54, a fluid meter 62 is provided on the downstream side of the relief valve 56 and the flow rate of the operating oil flowing from the relief valve 56 to the tank 25 is measured. With the fourth embodiment, if the pump pressure increases more than a threshold value (a relief pressure), the relief valve 56 opens to enable the operating oil to pass through a fluid meter 62 and flow into the tank 25. While the relief valve 56 is closed, the operating oil does not flow into the fluid meter. Therefore, when the flow rate is measured by the fluid meter, the relief valve 56 is opened. In other words, the pump pressure becomes greater than the threshold value. The measured value of the fluid meter 62 is sent to the controller 42. The controller 42 controls the revolution speed of the engine 30 based on the measured value of the fluid meter 62. The flow rate measured by the fluid meter 62 is a flow rate (hereinafter, referred to as a flow rate) of the operating oil passing through the relief valve 56.

Figure 14:
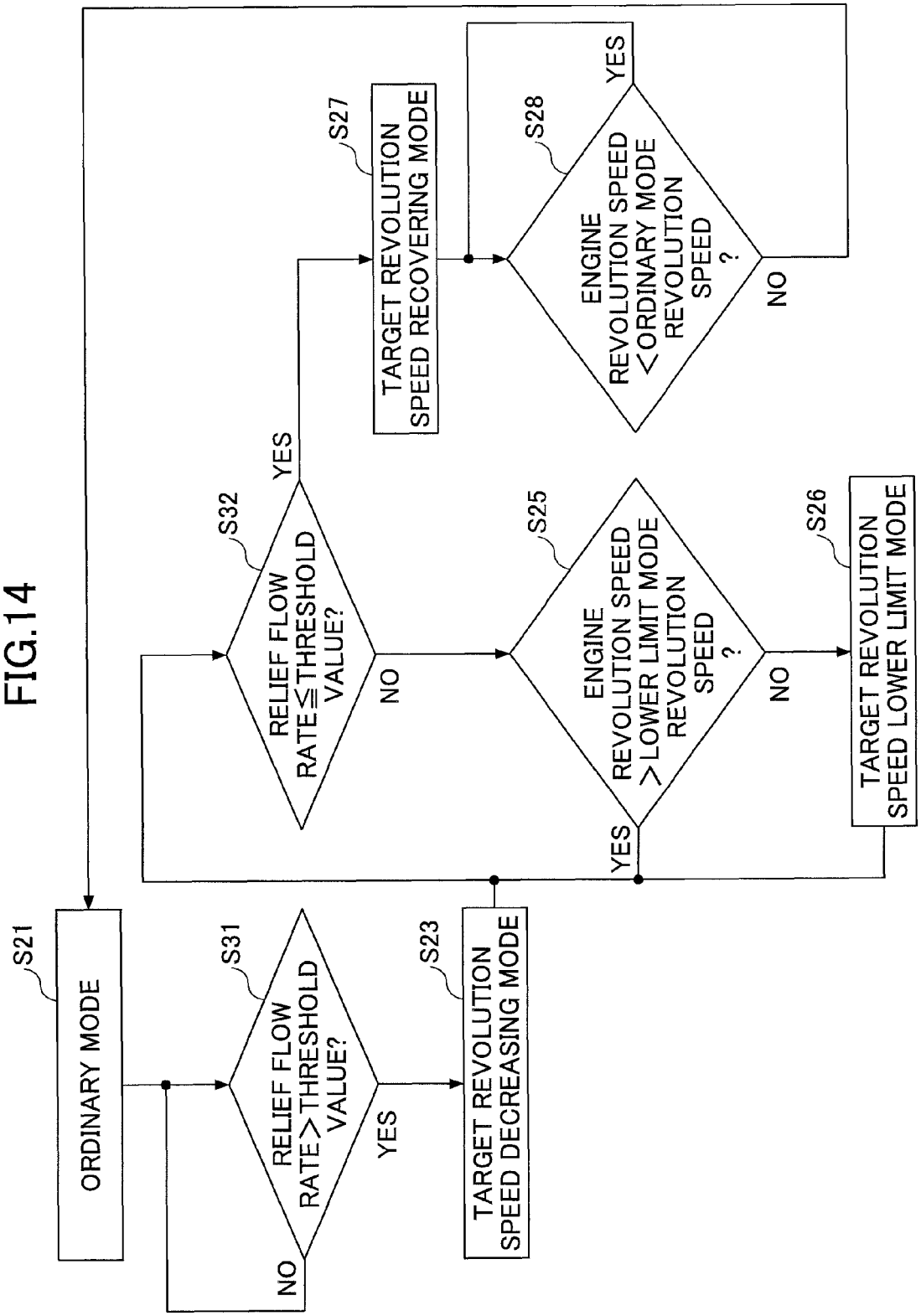
FIG. 14 is a flowchart of controlling the reduction of the revolution speed of the engine when a relief valve is opened.

FIG. 14 is a flowchart of controlling the reduction of the revolution speed of the engine 30 when the relief valve 56 is opened. Referring to FIG. 14, steps similar to those in FIG. 11 are indicated by the same step numbers in the preceding claims and description of these is omitted.

In the fourth embodiment, the process illustrated in step S31 is performed after step S21 in which the ordinary mode is set up. In step S31, it is determined whether the relief flow rate measured in the fluid meter 62 is greater than the predetermined threshold value. The predetermined threshold value is zero or the minimum flow rate which can be measured by the fluid meter. If the flow rate is greater than the threshold value, the relief valve 56 is opened and the operating oil flows into the fluid meter. Said differently, the pump pressure is higher than the threshold value (the relief pressure). Therefore, the determination in step S31 can be regarded as the same as the determination in step S22 of FIG. 11.

Therefore, if it is determined that the flow rate is greater than the threshold value in step S31, the process goes to step S23, in which the decreasing mode is set. Subsequently, a process of step S32 is performed instead of step S24. In step S32, it is determined whether the relief flow rate is the threshold value or smaller. If the relief flow rate is the threshold value or smaller, the relief valve 56 is closed and the operating oil does not flow into the fluid meter 62. If the relief valve 56 is closed, the pump pressure is the relief pressure or smaller. The determination in step S32 can be regarded the same as the determination of step S24 in FIG. 11.

The processes in step S32 and the subsequent steps are the same as those in the third embodiment and description of these are omitted.

In the fourth embodiment, the revolution speed of the engine 30 is decreased under the state in which the relief valve 56 is being opened. Thus, the discharge quantity of the operating oil from the hydraulic pump 21 is decreased. With this, it is possible to suppress unnecessary energy consumption by decreasing the quantity of the operating oil supplied to the hydraulic circuit from the hydraulic pump 21. If the relief valve 56 is closed, the revolution speed of the engine 30 is increased to be the ordinary mode revolution speed. Thus, the hydraulic pump 21 ordinarily supplies the hydraulic pressure. At this time, the revolution speed of the engine 30 is increased and decreased by the control of the revolution speed of the motor generator 34 thereby enabling increase and decrease of the revolution speed more rapidly than by the control of only the revolution speed of the engine 30.

Although the number of the hydraulic pump 21 is one in the third and fourth embodiments, the present invention is not limited to that number and applicable to a hydraulic circuit including two or more hydraulic pumps.

Figure 15:
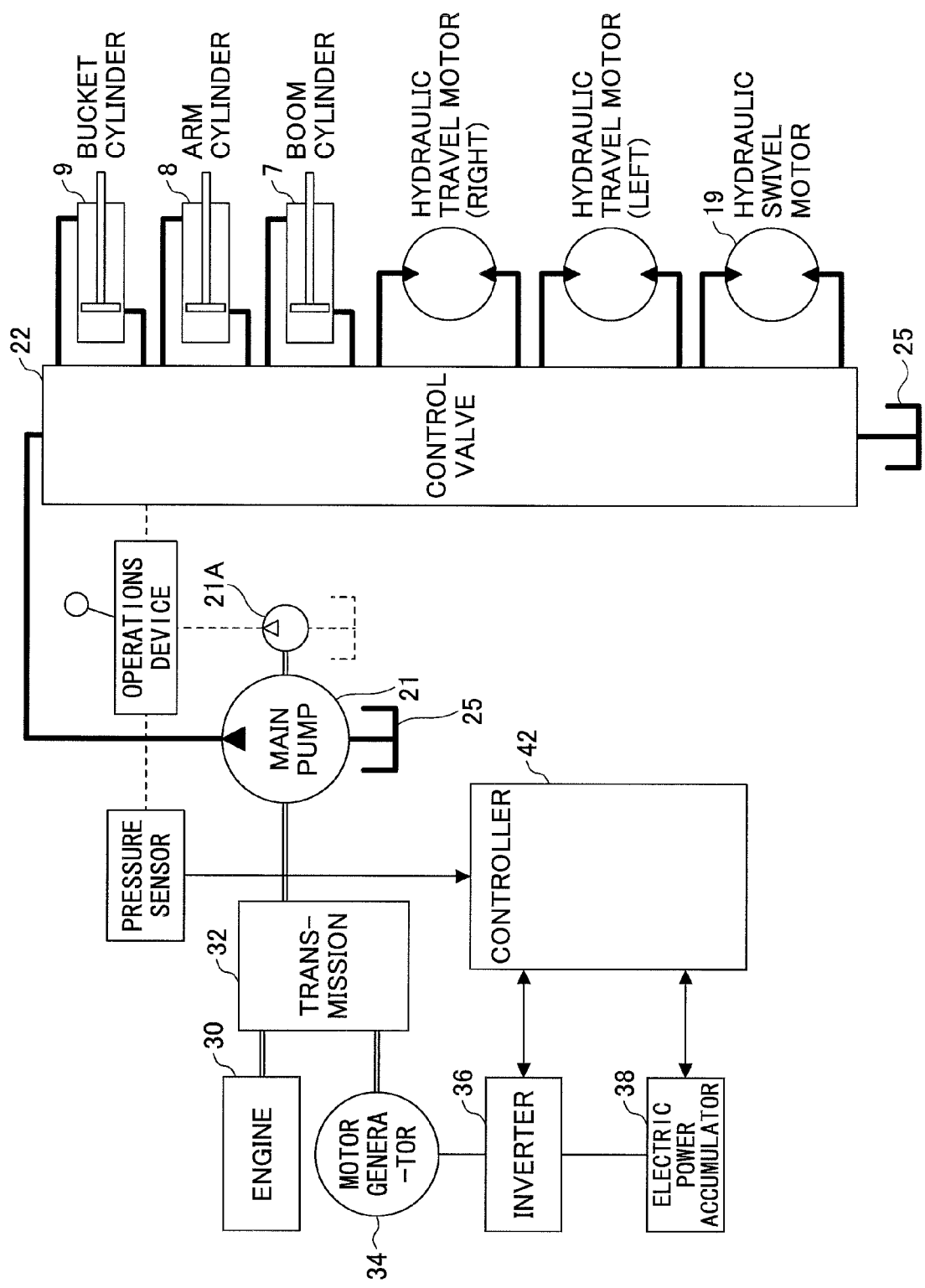
FIG. 15 is a block chart illustrating the structure of the drive-train of the hybrid-type power shovel when a hydraulic swivel motor is used as a power source for a swivel mechanism.

With the first to fourth embodiments, the swivel motor 18 being the electric motor is used as a power source of the swiveling mechanism 2 for swiveling the upper-part swiveling body. However, the swivel motor 18 may be a hydraulic motor. FIG. 15 is a block chart illustrating the structure of the drive-train of the hybrid-type power shovel when a hydraulic swivel motor 19 is used as the power source for the swivel mechanism 2. Referring to FIG. 15, the hydraulic swivel motor 19 is not an electric motor (an electric load) but a hydraulic motor (a hydraulic load). In the above embodiments, the engine revolution speed is maintained to be constant in the ordinary mode. However, the revolution speed of the engine may be variably controlled in the ordinary mode. In the above embodiments, the hybrid-type power shovel as the hybrid-type operation machine is described. However, a hybrid-type wheel loader or a hybrid-type crane may be used.

The present application is based on and claims the benefit of priority of Japanese Patent Application No. 2009-146553 filed on Jun. 19, 2009 and Japanese Patent Application No. 2009-146554 filed on Jun. 19, 2009, the entire contents of which are incorporated herein by reference.

INDUSTRIAL APPLICABILITY

The embodiments of the present invention are applicable to a hybrid-type construction machine in which an engine is assisted by a generator.

EXPLANATION OF REFERENCE SYMBOLS

1: lower-part traveling body
2: swivel mechanism
3: upper-part swiveling body
4: boom
5: arm
6: bucket
7: boom cylinder
8: arm cylinder
9: bucket cylinder
10: cabin
12: controller
13: mode selector
14: throttle volume
15: electromagnetic proportional valve
18: swivel motor
19: hydraulic swivel motor
20: engine motor
20a: swash plate
21: hydraulic pump
21A: pilot and gear pump
22: control valve
22a, 22b, 22c: switch valve
23: pump discharge pressure sensor
24: negative control metering valve (nega-con metering valve)
25: tank
26: negative control sensor (nega-con sensor)
27: regulator
30: engine
32: splitter
34: motor generator
36, 40: inverter
38: electric power accumulator
42: controller
50: hydraulic circuit
52: hydraulic control valve
54: hydraulic piping
56: relief valve
60: pressure sensor
62: fluid meter

The invention claimed is:

1. A hybrid-type construction machine comprising:
a controller configured to control a revolution speed of an engine;
a hydraulic pump configured to be driven by the engine;
a motor generator configured to assist the engine;
a hydraulic circuit configured to supply an operating oil discharged from the hydraulic pump to a hydraulic load;
a first pressure sensor configured to detect a pressure of the operating oil discharged from the hydraulic pump;
a control valve provided in the hydraulic circuit and configured to control a flow of the operating oil into the hydraulic load;
a negative control metering valve provided between the control valve and a tank; and
a second pressure sensor provided between the control valve and the negative control metering valve and configured to detect negative control pressure,
wherein the controller compares a first discharge quantity of the hydraulic pump acquired from a detection value of the first pressure sensor with a second discharge quantity of the hydraulic pump acquired from a detection value of the second pressure sensor, and
wherein, when the controller determines that the hydraulic circuit is in an excessive output state, the controller controls the revolution speed of the engine so as to be lower than an ordinary revolution speed of the engine while controlling the motor generator to generate electricity depending on a result of the comparison between the first discharge quantity of the hydraulic pump with the second discharge quantity of the hydraulic pump.

2. The hybrid-type construction machine according to claim 1, further comprising:
a relief valve configured to return the operating oil discharged from the hydraulic pump to a tank when a pressure inside the hydraulic circuit exceeds a predetermined pressure,
wherein, while the operating oil is returned to the tank via the relief valve, the controller controls the revolution speed of the engine so as to be lower than the ordinary revolution speed of the engine while controlling the motor generator to generate the electricity.

3. The hybrid-type construction machine according to claim 2,
wherein the controller determines that the hydraulic circuit is in the excessive output state using the result of the comparison between the first discharge quantity of the hydraulic pump with the second discharge quantity of the hydraulic pump.

4. The hybrid-type construction machine according to claim 1,
wherein the controller controls the motor generator so as to run as a motor when the revolution speed of the engine is increased.

5. The hybrid-type construction machine according to claim 1,
wherein the controller controls the motor generator with a torque control when the revolution speed of the engine is maintained to have a predetermined value.

6. The hybrid-type construction machine according to claim 1,
wherein the controller controls the motor generator with a revolution speed control when the revolution speed of the motor generator is increased or decreased.

7. The hybrid-type construction machine according to claim 1,
wherein the controller determines that the hydraulic circuit is in the excessive output state relative to an operation condition of the hydraulic load.

8. A control method of a hybrid-type construction machine including
a hydraulic pump configured to be driven by the engine,
a motor generator configured to assist the engine,
a hydraulic circuit configured to supply an operating oil discharged from the hydraulic pump to a hydraulic load,
a first pressure sensor configured to detect a pressure of the operating oil discharged from the hydraulic pump,
a control valve provided in the hydraulic circuit and configured to control a flow of the operating oil into the hydraulic load,
a negative control metering valve provided between the control valve and a tank, and
a second pressure sensor provided between the control valve and the negative control metering valve and configured to detect negative control pressure, the control method comprising:
comparing a first discharge quantity of the hydraulic pump acquired from a detection value of the first pressure sensor with a second discharge quantity of the hydraulic pump acquired from a detection value of the second pressure sensor;
determining whether the hydraulic circuit is in an excessive output state; and
controlling a revolution speed of the engine so as to be lower than an ordinary revolution speed of the engine by controlling the motor generator to generate electricity depending on a result of the comparison between the first discharge quantity of the hydraulic pump with the second discharge quantity of the hydraulic pump.

9. The control method of the hybrid-type construction machine according to claim 8,
wherein the controlling is to run the motor generator as a motor when the revolution speed of the engine is increased.

10. The control method of the hybrid-type construction machine according to claim 8,
wherein the controlling is to control the motor generator with a torque control when the revolution speed of the engine is maintained to have a predetermined value.

11. The control method of the hybrid-type construction machine according to claim 8,
wherein the controlling is to control the motor generator with a revolution speed control when the revolution speed of the motor generator is increased or decreased.

12. The control method of the hybrid-type construction machine according to claim 8,
wherein the controlling is to determine that the hydraulic circuit is in the excessive output state relative to an operation condition of the hydraulic load.

13. A hybrid-type construction machine comprising:
a controller configured to control a revolution speed of an engine;
a hydraulic pump configured to be driven by the engine;
a motor generator configured to assist the engine; and
a hydraulic circuit configured to supply an operating oil discharged from the hydraulic pump to a hydraulic load,
wherein when the controller determines that the hydraulic circuit is in an excessive output state, the controller controls the revolution speed of the engine so as to be lower than an ordinary revolution speed of the engine while controlling the motor generator to generate electricity, and
wherein the controller controls the motor generator at least with a torque control or a revolution speed control, and the torque control is switched to the revolution speed control when the revolution speed of the motor generator is decreased.

\* \* \* \* \*